(12) United States Patent
Futae et al.

(10) Patent No.: US 11,066,983 B2
(45) Date of Patent: Jul. 20, 2021

(54) LUBRICATING DEVICE FOR BEARING, AND EXHAUST TURBOSUPERCHARGER

(71) Applicant: MITSUBISHI HEAVY INDUSTRIES ENGINE & TURBOCHARGER, LTD., Sagamihara (JP)

(72) Inventors: Takaya Futae, Tokyo (JP); Yuta Ishii, Tokyo (JP); Yuya Kojima, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 46 days.

(21) Appl. No.: 16/311,959

(22) PCT Filed: Mar. 21, 2017

(86) PCT No.: PCT/JP2017/011254
§ 371 (c)(1),
(2) Date: Dec. 20, 2018

(87) PCT Pub. No.: WO2018/138938
PCT Pub. Date: Aug. 2, 2018

(65) Prior Publication Data
US 2019/0203635 A1 Jul. 4, 2019

(30) Foreign Application Priority Data
Jan. 27, 2017 (JP) .............................. JP2017-013265

(51) Int. Cl.
*F02B 39/14* (2006.01)
*F01D 25/16* (2006.01)
(Continued)

(52) U.S. Cl.
CPC .............. *F02B 39/14* (2013.01); *F01D 25/16* (2013.01); *F01D 25/18* (2013.01); *F02B 39/00* (2013.01);
(Continued)

(58) Field of Classification Search
CPC .......... F02B 39/14; F02B 39/00; F01D 25/16; F01D 25/18; F16C 17/02; F16C 17/18;
(Continued)

(56) References Cited

U.S. PATENT DOCUMENTS 2,668,006 A * 2/1954 Larrecq ..................... F02C 6/12
415/218.1
3,411,706 A * 11/1968 Woollenweber, Jr. .....................
F16C 17/18
417/407

(Continued)

FOREIGN PATENT DOCUMENTS

CN 104747597 A 7/2015
DE 102009059660 A1 * 6/2011 .............. F16C 17/02
(Continued)

OTHER PUBLICATIONS

Extended European Search Report dated Oct. 14, 2019, for corresponding European Patent Application No. 17894636.4.
(Continued)

*Primary Examiner* — Thai Ba Trieu
(74) *Attorney, Agent, or Firm* — Birch, Stewart, Kolasch & Birch, LLP

(57) ABSTRACT

Provided are: a lubricating device for a bearing; and an exhaust turbosupercharger, wherein a bearing device (36) is provided with a housing (15) with a hollow shape, and journal bearings (21, 22) which rotatably support a rotary shaft (14) arranged inside the housing (15), the bearing device (36) being further provided with: a third feeding passage (43) and a fourth feeding passage (44) through which lubricant is fed toward outer circumferential surfaces (21b, 22b) of the journal bearings (21, 22); a sixth feeding passage (46) through which lubricant is fed toward a space section (16A) between the journal bearings (21, 22); and a guide section which guides, toward inner circumferential
(Continued)

surfaces (21c, 22c) of the journal bearings (21, 22), the lubricant fed from the sixth feeding passage (46) to the space section (16A).

17 Claims, 10 Drawing Sheets

(51) Int. Cl.
| | |
|---|---|
| F01D 25/18 | (2006.01) |
| F02B 39/00 | (2006.01) |
| F16C 17/02 | (2006.01) |
| F16C 17/26 | (2006.01) |
| F16C 33/10 | (2006.01) |
| F16N 7/36 | (2006.01) |
| F16N 7/38 | (2006.01) |
| F16N 7/40 | (2006.01) |
| F16N 13/00 | (2006.01) |
| F16C 27/02 | (2006.01) |
| F16C 35/02 | (2006.01) |
| F16C 17/18 | (2006.01) |
| F01M 11/02 | (2006.01) |

(52) U.S. Cl.
CPC ............. *F16C 17/02* (2013.01); *F16C 17/18* (2013.01); *F16C 17/26* (2013.01); *F16C 33/10* (2013.01); *F16C 33/1045* (2013.01); *F16N 7/36* (2013.01); *F16N 7/38* (2013.01); *F16N 7/40* (2013.01); *F16N 13/00* (2013.01); *F01M 2011/021* (2013.01); *F05D 2220/40* (2013.01); *F05D 2240/54* (2013.01); *F05D 2260/98* (2013.01); *F16C 27/02* (2013.01); *F16C 35/02* (2013.01); *F16C 2360/24* (2013.01); *F16N 2210/14* (2013.01)

(58) Field of Classification Search
CPC ...... F16C 17/26; F16C 33/10; F16C 33/1045; F16C 27/02; F16C 35/02; F16N 2360/24; F16N 7/36; F16N 7/38; F16N 7/40; F16N 13/00; F16N 2210/14; F01M 2011/021; F05D 2220/40; F05D 2240/54; F05D 2260/98
USPC ................ 60/605.3; 384/99, 368, 518, 466; 184/6.11, 6.22; 417/407; 415/111, 116
See application file for complete search history.

(56) References Cited

U.S. PATENT DOCUMENTS

| | | | | |
|---|---|---|---|---|
| 3,728,857 | A * | 4/1973 | Nichols | F01D 25/22 184/6.11 |
| 4,006,944 | A * | 2/1977 | Ando | F16C 33/6674 184/6.22 |
| 4,116,506 | A * | 9/1978 | Moritomo | F16C 33/6659 384/518 |
| 5,454,646 | A * | 10/1995 | Reisdorf | F16C 17/18 384/99 |
| 5,529,399 | A * | 6/1996 | Holze | F16C 17/10 384/107 |
| 6,739,756 | B2 * | 5/2004 | Miller | F16C 17/18 384/117 |
| 8,991,176 | B2 * | 3/2015 | Begin | F02B 39/08 60/605.3 |
| 9,726,189 | B2 * | 8/2017 | Nishida | F01D 25/16 |
| 9,951,817 | B2 * | 4/2018 | Meyers | F01D 25/18 |
| 2002/0141862 | A1 * | 10/2002 | McEwen | F01D 25/18 415/111 |
| 2004/0008913 | A1 | 1/2004 | Uesugi et al. | |
| 2005/0047690 | A1 * | 3/2005 | Keramati | F16C 17/02 384/368 |
| 2010/0132358 | A1 * | 6/2010 | Purdey | F16C 33/103 60/605.3 |
| 2013/0108483 | A1 * | 5/2013 | Becker | F16C 17/18 417/313 |
| 2015/0292517 | A1 * | 10/2015 | Bucking | F01D 25/16 415/116 |
| 2016/0348577 | A1 | 12/2016 | Uneura et al. | |
| 2017/0045084 | A1 | 2/2017 | Uneura et al. | |
| 2017/0108035 | A1 * | 4/2017 | Hinds | F02B 39/14 |
| 2017/0370409 | A1 * | 12/2017 | Burkinshaw | F16C 33/121 |
| 2018/0179954 | A1 * | 6/2018 | Klusacek | F16C 17/02 |
| 2019/0048933 | A1 * | 2/2019 | Kojima | F16C 33/106 |
| 2019/0078732 | A1 * | 3/2019 | Kojima | F16C 17/04 |

FOREIGN PATENT DOCUMENTS

| | | | | |
|---|---|---|---|---|
| JP | 58183822 | A * | 10/1983 | ............. F16C 17/02 |
| JP | 61-4017 | U | 1/1986 | |
| JP | 61-66222 | U | 5/1986 | |
| JP | 63-88318 | A | 4/1988 | |
| JP | 4-58618 | U | 5/1992 | |
| JP | 5-71537 | A | 3/1993 | |
| JP | 8-9587 | A | 1/1996 | |
| JP | 2004-44639 | A | 2/2004 | |
| JP | 2007-100644 | A | 4/2007 | |
| JP | 2008-255825 | A | 10/2008 | |
| JP | 2010-127318 | A | 6/2010 | |
| JP | 5337227 | B2 | 11/2013 | |
| JP | 2014-47680 | A | 3/2014 | |
| WO | WO 2015/166806 | A1 | 11/2015 | |
| WO | WO 2016/027617 | A1 | 2/2016 | |
| WO | WO-2016097766 | A1 * | 6/2016 | ............. F16C 17/18 |

OTHER PUBLICATIONS

Japanese Office Action, dated Jan. 29, 2019, for Japanese Application No. 2017-013265, with an English translation.

Written Opinion of the International Searching Authority(Form PCT/ISA/237), dated Jun. 27, 2017, for International Application No. PCT/JP2017/011254, with an English translation.

Chinese Office Action and Search Report for Chinese Application No. 201780039825.6, dated Aug. 11, 2020, with English translation of the Office Action.

* cited by examiner

LUBRICATING DEVICE FOR BEARING, AND EXHAUST TURBOSUPERCHARGER

TECHNICAL FIELD

The present invention relates to a lubricating device for a bearing and an exhaust turbine turbocharger to which the lubricating device for a bearing is applied.

BACKGROUND ART

In the related art, for example, PTL 1 discloses a journal bearing (a floating bush bearing). In the journal bearing, a communication hole for lubricating oil is formed from an outer peripheral surface supported by a bearing housing toward an inner peripheral surface supporting a rotary shaft.

CITATION LIST

Patent Literature

[PTL 1] Japanese Patent No. 5337227

SUMMARY OF INVENTION

Technical Problem

As described above, with respect to the journal bearing in which the communication hole for lubricating oil is formed from the outer peripheral surface to the inner peripheral surface, in the bearing housing supporting the journal bearing, a lubricating oil supply passage is formed toward the outer peripheral surface of the journal bearing. In addition, a lubricating oil is supplied to the outer peripheral surface of the journal bearing through the lubricating oil supply passage. A portion of the lubricating oil supplied to the outer peripheral surface of the journal bearing forms an oil film between the outer peripheral surface of the journal bearing and the bearing housing, and the other portion of the lubricating oil is supplied to the inner peripheral surface of the journal bearing through the communication hole for lubricating oil to form an oil film between the inner peripheral surface of the journal bearing and the rotary shaft. Accordingly, the journal bearing rotatably supports the rotary shaft.

Meanwhile, in recent years, according to a reduction in a size of an engine corresponding to the improvement of fuel consumption, a reduction in a size and high efficiency of an exhaust turbine turbocharger are required. Accordingly, the maximum rotation speed of the exhaust turbine turbocharger increases. That is, a rotation speed of the rotary shaft increases. Accordingly, a force which returns the lubricating oil from the inner peripheral surface side of the journal bearing to the outer peripheral surface side thereof is applied to the communication hole for lubricating oil by a centrifugal force when the rotary shaft rotates at a high speed, and an amount of the lubricating oil on the inner peripheral surface of the journal bearing decreases. Moreover, in a case where the lubricating oil on the inner peripheral surface of the journal bearing is exhausted, there is a concern that seizure of the inner peripheral surface of the journal bearing and the outer peripheral surface of the rotary shaft may occur. Meanwhile, in order to solve the above-described problem, it is conceivable to increase a supply pressure of the lubricating oil supplied from the lubricating oil supply passage. However, if the supply pressure is too high, discharge of the lubricating oil from the vicinity of the journal bearing increases, and as a result, there is a concern that an amount of the lubricating oil supplied to the outer peripheral surface and the inner peripheral surface of the journal bearing may decrease. In addition, when the rotary shaft is rotated at a low speed, the lubricating oil may be sucked into the inner peripheral surface along a side surface of the journal bearing, and thus, a ratio of a bearing loss caused by a stirring resistance of the lubricating oil increases.

The present invention is made to solve the above-described problems, and an object thereof is to provide a lubricating device for a bearing and an exhaust turbine turbocharger capable of supplying an appropriate amount of lubricating oil.

Solution to Problem

In order to achieve the above-described object, according to an aspect of the present invention, there is provided a lubricating device for a bearing in a bearing device including a housing which has a hollow shape and a plurality of journal bearings which rotatably support a rotary shaft disposed inside the housing at least two locations in an axial direction, the lubricating device including: a plurality of outer peripheral portion lubricating oil supply passages through which a lubricating oil is supplied to outer peripheral surfaces of the plurality of journal bearings; an intermediate portion lubricating oil supply passage through which the lubricating oil is supplied to a space portion between the plurality of journal bearings; and a guide portion which guides the lubricating oil, which is supplied from the intermediate portion lubricating oil supply passage to the space portion, to inner peripheral surfaces of the plurality of journal bearings.

Accordingly, the lubricating oil is supplied to the outer peripheral surfaces of the respective journal bearings through the outer peripheral portion lubricating oil supply passage, is supplied to the space portion between the journal bearings through the intermediate portion lubricating oil supply passage, and is supplied to the inner peripheral surfaces of the respective journal bearings by the guide portion. Accordingly, the lubricating oil is separately supplied to the outer peripheral surfaces and the inner peripheral surfaces of the journal bearings from the passages, respectively and thus, it is possible to supply an appropriate amount of lubricating oil without excess or deficiency. In this case, the lubricating oil supplied to the space portion between the journal bearings is supplied to the inner peripheral surfaces of the respective journal bearings by the guide portion, and thus, it is possible to supply a stable amount of lubricating oil to the journal bearings regardless of a rotation speed of the rotary shaft.

In the lubricating device for a bearing of the present invention, the guide portion is provided on an outer peripheral surface of the rotary shaft.

Accordingly, the guide portion is provided on the outer peripheral surface of the rotary shaft, and thus, the lubricating oil, which is supplied to the space portion through the intermediate portion lubricating oil supply passage and is attached to the rotary shaft, can be easily supplied to the inner peripheral surface of the journal bearing by the guide portion of the rotary shaft.

In the lubricating device for a bearing of the present invention, the guide portion is a plurality of spiral grooves which are provided on the outer peripheral surface of the rotary shaft, and the plurality of spiral grooves are provided to be turned in a reverse direction from a position at which the intermediate portion lubricating oil supply passage communicates with the space portion toward the plurality of journal bearings.

Accordingly, the guide portion is set to the plurality of spiral grooves which are provided on the outer peripheral surface of the rotary shaft to be turned in the reverse direction, and thus, the lubricating oil attached to the rotary shaft can be easily supplied to the inner peripheral surface of the journal bearing by the spiral grooves, a separate member constituting the guide portion is not required, and it is possible to suppress complication of a structure and an increase in a cost.

In the lubricating device for a bearing of the present invention, the guide portion is a guide surface which is provided on the outer peripheral surface of the rotary shaft and is inclined from a center side of the rotary shaft toward the outer peripheral surface side.

Accordingly, the guide portion is set to the guide surface which is provided on the outer peripheral surface of the rotary shaft and is inclined, the lubricating oil which is supplied from the intermediate portion lubricating oil supply passage to the space portion can be easily supplied to the inner peripheral surface of the journal bearing by the inclined guide surface.

In the lubricating device for a bearing of the present invention, the rotary shaft includes large-diameter portions which are supported by the plurality of journal bearings and small-diameter portions which are positioned between the plurality of journal bearings, and the guide surface is inclined from an outer peripheral surface of the small-diameter portion toward an outer peripheral surface of the large-diameter portion.

Accordingly, the guide surface, which is inclined from the outer peripheral surface of the small-diameter portion toward the outer peripheral surface of the large-diameter portion, is provided, and thus, the lubricating oil supplied to the space portion can be easily supplied from the outer peripheral surface of the small-diameter portion to the large-diameter portion and the inner peripheral surface of the journal bearing via the guide surface.

In the lubricating device for a bearing of the present invention, a nozzle facing the plurality of journal bearings is provided in an opening portion through which the intermediate portion lubricating oil supply passage communicates with the space portion.

Accordingly, the nozzle is provided in the opening portion of the intermediate portion lubricating oil supply passage, the lubricating oil is injected from the nozzle to the journal bearing. Therefore, the lubricating oil can be reliably supplied to a portion between the inner peripheral surface of the journal bearing and the outer peripheral surface of the rotary shaft.

In the lubricating device for a bearing of the present invention, a plurality of stop rings which restrict movements of the plurality of journal bearings in a direction approaching each other are provided on an inner peripheral surface of the housing, and protrusion portions extending to the plurality of journal bearings are provided on inner peripheral portions of the plurality of stop rings, as the guide portion.

Accordingly, the protrusion portion serving as the guide portion is provided on the stop ring which restricts the movement of the journal bearing, and thus, the lubricating oil supplied to the space portion through the intermediate portion lubricating oil supply passage can be easily supplied to the inner peripheral surface of the journal bearing by the protrusion portion of the stop ring, a separate member constituting the guide portion is not required, and it is possible to suppress complication of a structure and an increase in a cost.

The lubricating device for a bearing of the present invention further includes a tubular member which is accommodated in the space portion between the plurality of journal bearings and into which the rotary shaft is inserted, in which the tubular member includes a plurality of through-holes which penetrate the tubular member in a radial direction to communicate with the intermediate portion lubricating oil supply passage, and the housing includes a recessed portion provided on a vertically lower inner peripheral surface facing the space portion, as the guide portion.

Accordingly, the recessed portion is provided on the inner peripheral surface of the housing facing the space portion between the journal bearings, as the guide portion, and thus, the lubricating oil supplied to the space portion through the intermediate portion lubricating oil supply passage can be easily supplied to the inner peripheral surface of the journal bearing by the recessed portion of the housing, a separate member constituting the guide portion is not required, and it is possible to suppress complication of a structure and an increase in a cost.

The lubricating device for a bearing of the present invention further includes a tubular member which is accommodated in the space portion between the plurality of journal bearings and into which the rotary shaft is inserted, in which the tubular member includes a plurality of through-holes which penetrate the tubular member in a radial direction to communicate with the intermediate portion lubricating oil supply passage, and a recessed portion, which communicates with the plurality of through-holes and faces an inner peripheral surface of the housing, as the guide portion.

Accordingly, the recessed portion serving as the guide portion is provided on the tubular member provided between the journal bearings, the lubricating oil supplied to the space portion through the intermediate portion lubricating oil supply passage can be easily supplied to the inner peripheral surface of the journal bearing by the recessed portion of the tubular member, a separate member constituting the guide portion is not required, and it is possible to suppress complication of a structure and an increase in a cost.

The lubricating device for a bearing of the present invention further includes a tubular member which is accommodated in the space portion between the plurality of journal bearings and into which the rotary shaft is inserted, in which the tubular member includes a plurality of through-holes which penetrate the tubular member in a radial direction to communicate with the intermediate portion lubricating oil supply passage, and protrusion portions which extend to the plurality of journal bearings, as the guide portion.

Accordingly, the protrusion portion serving as the guide portion is provided on the tubular member provided between the journal bearings, the lubricating oil supplied to the space portion through the intermediate portion lubricating oil supply passage can be easily supplied to the inner peripheral surface of the journal bearing by the protrusion portion of the tubular member, a separate member constituting the guide portion is not required, and it is possible to suppress complication of a structure and an increase in a cost.

In addition, according another aspect of the present invention, there is provided an exhaust turbine turbocharger, including: a turbine; a compressor; a rotary shaft which coaxially connects the turbine and the compressor to each other; a bearing device which includes a journal bearing rotatably supporting the rotary shaft; and the lubricating device for a bearing.

Accordingly, the lubricating oil is separately supplied to the outer peripheral surfaces and the inner peripheral surfaces of the journal bearings supporting the rotary shaft from the passages, respectively and thus, it is possible to supply an appropriate amount of lubricating oil without excess or deficiency. In this case, the lubricating oil supplied to the space portion between the journal bearings is supplied to the inner peripheral surfaces of the respective journal bearings by the guide portion, and thus, it is possible to supply a stable amount of lubricating oil to the journal bearings regardless of the rotation speed of the rotary shaft.

Advantageous Effects of Invention

According to the lubricating device for a bearing and the exhaust turbine turbocharger of the present invention, it is possible to supply an appropriate amount of lubricating oil without excess or deficiency.

DESCRIPTION OF EMBODIMENTS

Hereinafter, preferred embodiments of a lubricating device for a bearing and an exhaust turbine turbocharger according to the present invention will be described in detail with reference to the accompanying drawings. In addition, the present invention is not limited by the embodiments. In addition, in a case where there are a plurality of embodiments, the present invention includes a combination of the embodiments.

First Embodiment

Figure 1:
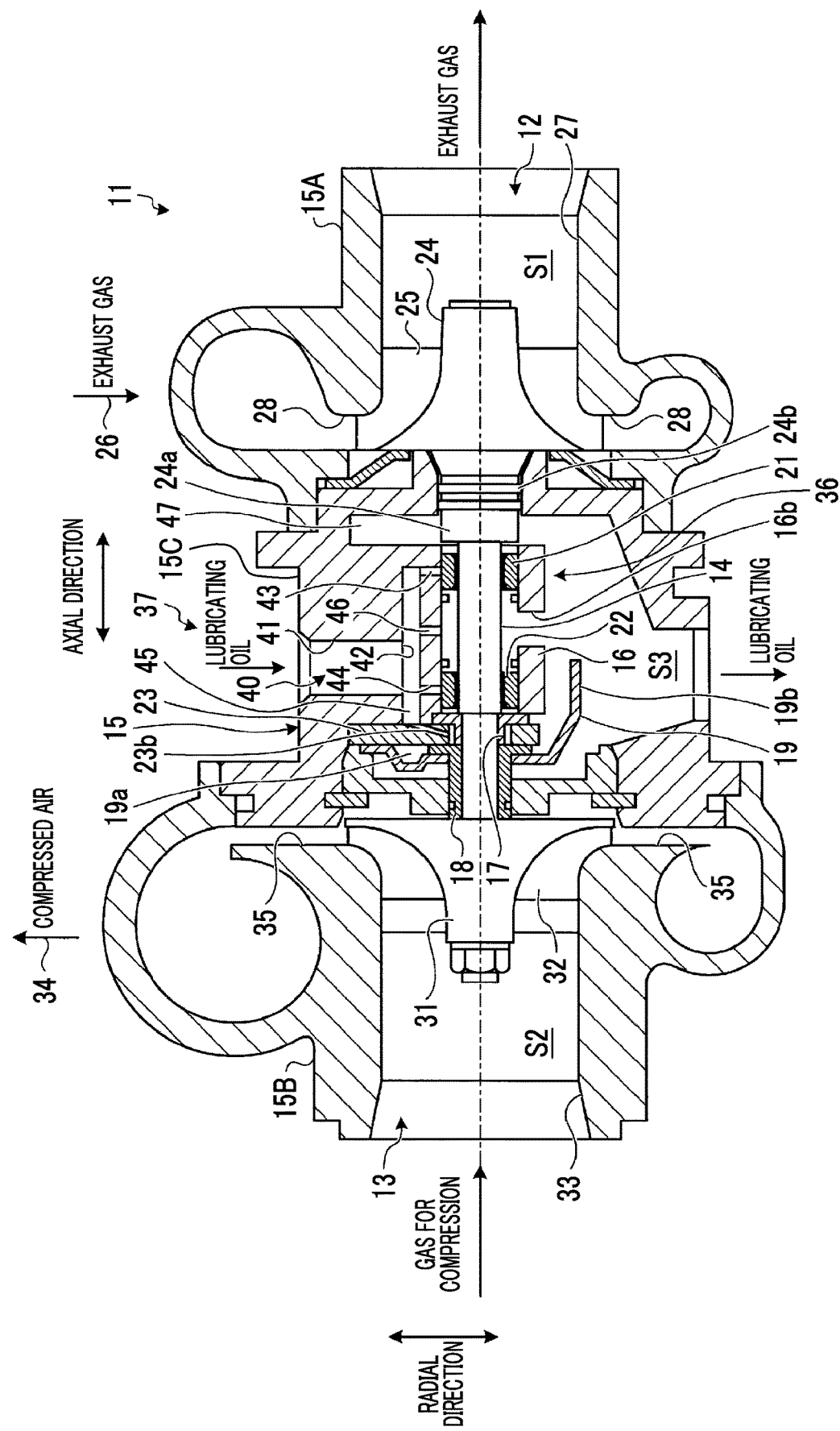
FIG. 1 is an overall configuration view of an exhaust turbine turbocharger according to a first embodiment.
Figure 2:
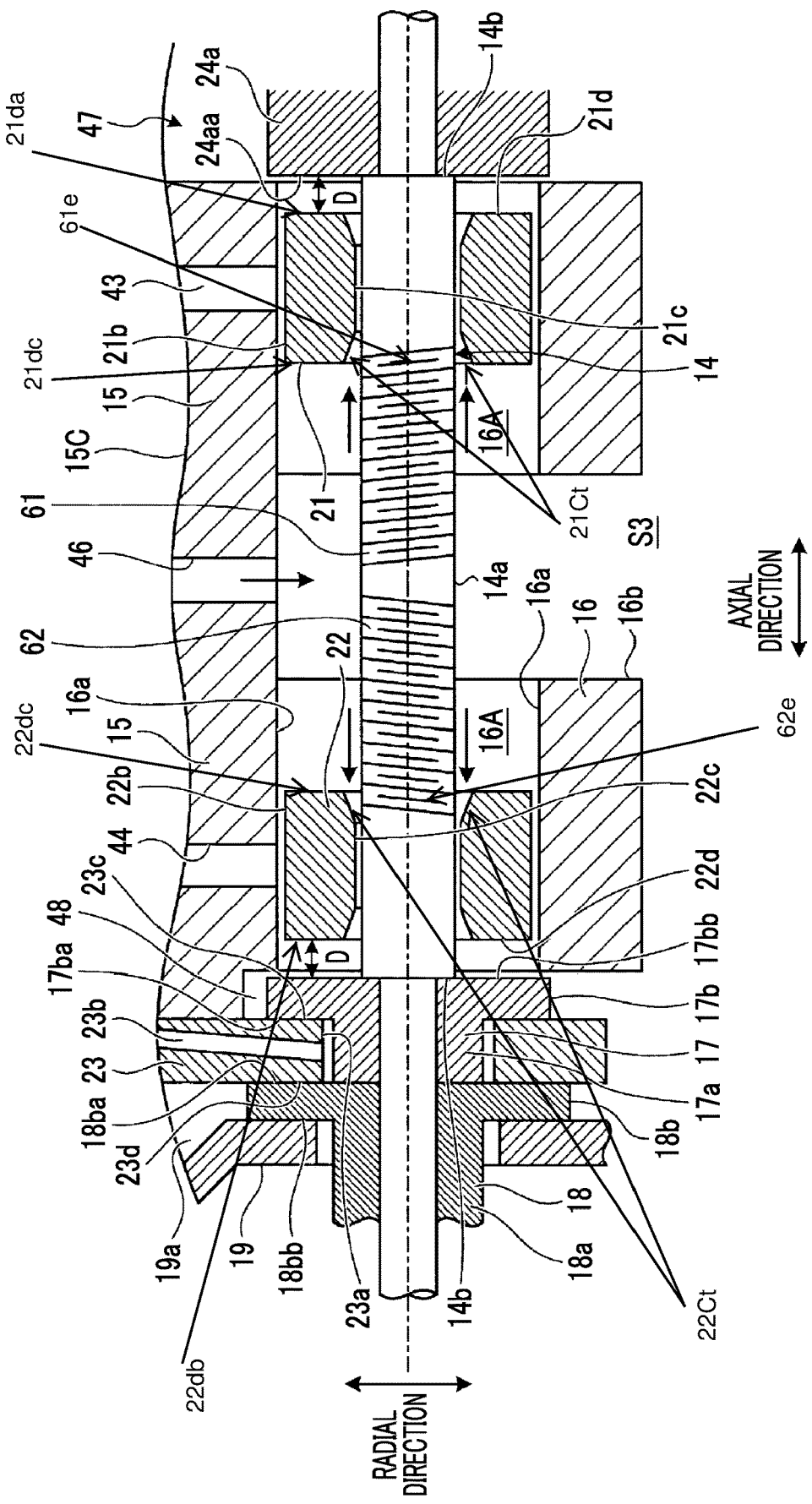
FIG. 2 is a schematic view showing a lubricating device for a bearing of the exhaust turbine turbocharger according to the first embodiment.

FIG. 1 is an overall configuration view of an exhaust turbine turbocharger according to a first embodiment and FIG. 2 is a schematic view showing a lubricating device for a bearing of the exhaust turbine turbocharger according to the first embodiment.

As shown in FIG. 1, an exhaust turbine turbocharger 11 mainly includes a turbine 12, a compressor 13, and a rotary shaft 14, and these are accommodated in a housing 15.

An inside of the housing 15 is formed in a hollow shape, and the housing 15 includes a turbine housing 15A forming a first space portion S1 in which a configuration of the turbine 12 is accommodated, a compressor cover 15B forming a second space portion S2 in which a configuration of the compressor 13 is accommodated, and a bearing housing 15C forming a third space portion S3 in which the rotary shaft 14 is accommodated. The third space portion S3 of the bearing housing 15C is positioned between the first space portion S1 of the turbine housing 15A and the second space portion S2 of the compressor cover 15B.

In the rotary shaft 14, an end portion on the turbine 12 side is rotatably supported by a journal bearing 21 which is a turbine-side bearing, an end portion on the compressor 13 side is rotatably supported by a journal bearing 22 which is a compressor-side bearing, and a movement of the rotary shaft 14 in an axial direction in which the rotary shaft 14 extends is restricted by a thrust bearing 23. In addition, a turbine disk 24 of the turbine 12 is fixed to one end portion of the rotary shaft in the axial direction. The turbine disk 24 is accommodated in the first space portion S1 of the turbine housing 15A, and a plurality of turbine blades 25 forming an axial flow type are provided on an outer peripheral portion of the turbine disk 24 with a predetermined gap therebetween in a circumferential direction. In addition, a compressor impeller 31 of the compressor 13 is fixed to the other end portion of the rotary shaft 14 in the axial direction, the compressor impeller 31 is accommodated in the second space portion S2 of the compressor cover 15B, and a plurality of blades 32 are provided on an outer peripheral portion of the compressor impeller 31 with a predetermined gap therebetween in the circumferential direction.

Moreover, the turbine housing 15A includes an inlet passage 26 of an exhaust gas and an outlet passage 27 of the exhaust gas with respect to the turbine blades 25. In addition, in the turbine housing 15A, a turbine nozzle 28 is provided between the inlet passage 26 and the turbine blades 25, an axial exhaust gas flow which is statically pressure-expanded by the turbine nozzle 28 is led to the plurality of turbine blades 25 by the turbine nozzle 28, and thus, the turbine 12 can be rotationally driven. In addition, the compressor cover 15B includes an air intake port 33 and a compressed air discharge port 34 with respect to the compressor impeller 31. In addition, in the compressor cover 15B, a diffuser 35 is provided between the compressor impeller 31 and the compressed air discharge port 34. Air compressed by the compressor impeller 31 is discharged through the diffuser 35.

In the exhaust turbine turbocharger 11 configured as described above, the turbine 12 is driven by an exhaust gas discharged from an engine (not shown), a rotation of the turbine 12 is transmitted to the rotary shaft 14 to drive the compressor 13, and the compressor 13 compresses a combustion gas to supply the compressed combustion gas to the engine. Accordingly, the exhaust gas from the engine passes through the inlet passage 26 of the exhaust gas and is statically pressure-expanded by the turbine nozzle 28, and the axial exhaust gas flow is led to the plurality of turbine blades 25. Therefore, the turbine 12 is rotationally driven via the turbine disk 24 to which the plurality of turbine blades 25 are fixed. In addition, the exhaust gas which drives the plurality of turbine blades 25 is discharged to the outside from the outlet passage 27. Meanwhile, if the rotary shaft 14 is rotated by the turbine 12, the integral compressor impeller 31 is rotated, and air is sucked through the air intake port 33. The sucked air is compressed by the compressor impeller 31 and becomes compressed air, and the compressed air is supplied from the compressed air discharge port 34 to the engine through the diffuser 35.

The exhaust turbine turbocharger 11 includes a housing 15 which has a hollow shape, and a bearing device which includes a plurality of (two in the present embodiment) journal bearings 21 and 22 which rotatably support the rotary shaft 14 disposed inside the housing 15 at at least two locations in the axial direction and a thrust bearing 23. In addition, the exhaust turbine turbocharger 11 includes a lubricating device 37 which supplies a lubricating oil to the journal bearings 21 and 22 and the thrust bearing 23 of the bearing device 36.

That is, a lubricating oil supply passage 40 through which a lubricating oil is supplied to the journal bearings 21 and 22 and the thrust bearing 23 is provided in the bearing housing 15C. The lubricating oil supply passage 40 includes a first supply passage 41 formed in a radial direction on an upper portion of the bearing housing 15C, a second supply passage 42 formed in the axial direction on the upper portion of the bearing housing 15C, a third supply passage (outer peripheral portion lubricating oil supply passage) 43 which communicates with the journal bearing 21, a fourth supply passage (outer peripheral portion lubricating oil supply passage) 44 which communicates with the journal bearing 22, a fifth supply passage 45 which communicates with the thrust bearing 23, and a sixth supply passage (intermediate portion lubricating oil supply passage) 46 which communicates with a space portion 16A of a bearing accommodating portion 16 described later. A base portion of the first supply passage 41 is connected to a lubricating oil tank (not shown), and a tip portion thereof communicates with an intermediate portion of the second supply passage 42. A base portion of the third supply passage 43 communicates with the second supply passage 42 and a tip portion thereof communicates with the journal bearing 21. A base portion of the fourth supply passage 44 communicates with the second supply passage 42 and a tip portion thereof communicates with the journal bearing 22. A base portion of the fifth supply passage 45 communicates with the second supply passage 42 and a tip portion thereof communicates with the thrust bearing 23. A base portion of the sixth supply passage 46 communicates with the second supply passage 42 and a tip portion thereof communicates with the space portion 16A of the bearing accommodating portion 16 between the two journal bearings 21 and 22.

The lubricating device 37 includes above-described lubricating oil supply passage 40, and the lubricating oil supply passage 40 includes the first supply passage 41, the second supply passage 42, the third supply passage 43, the fourth supply passage 44, the fifth supply passage 45, and the sixth supply passage 46.

As shown in FIGS. 1 and 2, each of the journal bearings 21 and 22 is formed in a cylindrical shape. The journal bearings 21 and 22 are configured to be separated from each other and are accommodated in a columnar space portion 16A which is formed by the bearing accommodating portion 16 provided in the third space portion S3 in the bearing housing 15C. In the bearing accommodating portion 16 supporting the respective journal bearings 21 and 22, a passage 16b leading to a lower portion of the third space portion S3 between the journal bearings 21 and 22 is formed.

As shown in FIG. 2, the journal bearing 21 is rotatably supported between an outer peripheral surface 21b and an inner peripheral surface 16a of the bearing accommodating portion 16, and the journal bearing 21 rotatably supports the rotary shaft 14 between an inner peripheral surface 21c and an outer peripheral surface 14a of the rotary shaft 14. In the journal bearing 21, the tip portion of the third supply passage 43 communicates with the outer peripheral surface 21b. Moreover, in the journal bearing 21 shown in the drawings the outer peripheral surface 21b and the inner peripheral surface 21c do not communicate with each other. Further, the journal bearing 21 has a first side surface portion 21da facing the turbine 12 and a second side surface portion 21dc facing the compressor 13. The peripheral surface 21c, at an end of the second side surface portion 21dc side, is provided with a first notch 21 Ct.

As shown in FIG. 2, apart from the journal bearing 21, the journal bearing 22 is rotatably supported between the outer peripheral surface 22b and the inner surface 16a of the bearing accommodating portion 16, and the journal bearing 22 rotatably supports the rotary shaft 14 between an inner peripheral surface 22c and the outer peripheral surface 14a of the rotary shaft 14. In the journal bearing 22, the tip portion of the fourth supply passage 44 communicates with the outer peripheral surface 22b. Moreover, in the journal bearing 22 shown in the drawings the outer peripheral surface 22b and the inner peripheral surface 22c do not communicate with each other. Further, the journal bearing 22 has a third side surface portion 22da facing the turbine 12 and a second side surface portion 22db facing the compressor 13. An end of the peripheral surface 22c, at an end of the third side surface portion 22dc side, is provided with a second notch 22Ct.

In addition, the lubricating device 37 includes a guide portion which guides the lubricating oil supplied from the sixth supply passage 46 to the space portion 16A toward the inner peripheral surface 21c and 22c of the journal bearings 21 and 22. This guide portion is provided on the outer peripheral surface 14a of the rotary shaft 14. In the present embodiment, the guide portion is a plurality of (two in the present embodiment) spiral grooves 61 and 62 provided on the outer peripheral surface 14a of the rotary shaft 14, the respective spiral grooves 61 and 62 are provided to be turned in a reverse direction toward the respective journal bearings 21 and 22 from a position at which the sixth supply passage 46 communicates with the space portion 16A.

That is, the spiral groove 61 is provided on the outer peripheral surface 14a of the rotary shaft 14 from an opening position of the sixth supply passage 46 to the space portion 16A to a position at which only an end portion 61e of the spiral groove 61 toward the journal bearing 21 overlaps the first notch 21Ct of the inner peripheral surface 21c of the journal bearing 21 in the radial direction. Meanwhile, the spiral groove 62 is provided on the outer peripheral surface 14a of the rotary shaft 14 from an opening position of the sixth supply passage 46 to the space portion 16A to a position at which only an end portion 62e of the spiral groove 62 toward the journal bearing 22 overlaps the second notch 22Ct of the inner peripheral surface 22c of the journal bearing 22 in the radial direction.

As shown in FIG. 1, the thrust bearing 23 is disposed on the compressor 13 side to be adjacent to the journal bearing 22 in the axial direction of the rotary shaft 14. As shown in FIG. 2, the thrust bearing 23 is formed in a plate shape having an insertion hole 23a into which the rotary shaft 14 is inserted and is fixed to the bearing housing 15C. In addition, a passage 23b is formed in the thrust bearing 23. A base portion of the passage 23b communicates with the tip portion of the fifth supply passage 45 and a tip portion thereof communicate with the insertion hole 23a. The thrust bearing 23 restricts an axial movement of the rotary shaft 14 via a thrust ring 17 and a thrust sleeve 18.

As shown in FIG. 2, the thrust ring 17 includes a boss portion 17a and a flange portion 17b. The boss portion 17a is formed in a cylindrical shape, is fitted to a portion in which an end portion of the rotary shaft 14 on the compressor 13 side is formed to have a small diameter via a step portion 14b, abuts against the step portion 14b to be positioned in the axial direction, and is inserted into the insertion hole 23a of the thrust bearing 23 along with the rotary shaft 14. The flange portion 17b is a disk member which protrudes radially outward from a portion of the boss portion 17a abutting against the step portion 14b, and includes one facing portion 17ba disposed to face a plate surface 23c of the thrust bearing 23 on the journal bearing 22 side in the axial direction and the other facing portion 17bb disposed to face a side surface portion 22d of the journal bearing 22 with the gap D therebetween in the axial direction.

As shown in FIG. 2, the thrust sleeve 18 includes a boss portion 18a and a flange portion 18b. The boss portion 18a is formed in a cylindrical shape, is fitted to a portion which is formed to have a small diameter on the end portion of the rotary shaft 14 on the compressor 13 side, and abuts against the end surface of the boss portion 17a on the compressor 13 side in the thrust ring to be positioned in the axial direction. The flange portion 18b is a disk member which protrudes radially outward from a portion of the boss portion 18a abutting against the boss portion 17a of the thrust ring 17, and includes one facing portion 18ba which is disposed to face a plate surface 23d of the thrust bearing 23 on the compressor 13 side in the axial direction and the other facing portion 18bb which is disposed to face an oil storage portion 19 forming an oil storage space 19a from the compressor 13 side toward the thrust bearing 23 side in the axial direction. The oil storage portion 19 is formed such that the oil storage space 19a communicates with the lower portion of the third space portion S3.

That is, each of the thrust ring 17 and the thrust sleeve 18 is disposed such that the thrust bearing 23 is interposed between the facing portions 17ba and 18ba positioned one side of the flange portions 17b and 18b. Accordingly, the thrust bearing 23 restricts the axial movement of the rotary shaft 14 via the thrust ring 17 and the thrust sleeve 18.

In addition, as shown in FIG. 1, the turbine disk 24 of the turbine 12 includes a boss portion 24a which protrudes toward the compressor 13 side such that the turbine disk 24 is disposed to be adjacent to the journal bearing 21 in the axial direction. The boss portion 24a is formed in a cylindrical shape, is fitted to a portion in which an end portion of the rotary shaft 14 on the turbine 12 side is formed to have a small diameter via a step portion 14b, and abuts against the step portion 14b to be positioned in the axial direction. As shown in FIG. 2, the portion of the boss portion 24a abutting against the step portion 14b is a disk member which covers an opening of a columnar space on the turbine 12 side formed by the bearing accommodating portion 16, and the boss portion 24a includes a facing portion 24aa which is disposed so as to face the side surface portion 21d of the journal bearing 21 with a gap D therebetween in the axial direction. In addition, in the bearing housing 15C, an oil discharge space chamber 47 is formed on an outer peripheral portion of the boss portion 24a. Moreover, in the turbine disk 24 of the turbine 12, a seal portion 24b is formed between the boss portion 24a and the turbine disk 24 in the axial direction. The seal portion 24b forms a seal portion with the bearing housing 15C.

Here, a method for supplying the lubricating oil to the respective journal bearings 21 and 22 of the bearing device 36 by the lubricating device 37 of the present embodiment will be described.

As shown in FIGS. 1 and 2, in the bearing housing 15C, a base portion of a lubricating oil discharge pipe is connected to the lower portion of the third space portion S3. A tip portion of the lubricating oil discharge pipe is connected to an oil pan. The oil pan is connected to the lubricating oil tank, which is connected to first supply passage 41 of the lubricating oil supply passage 40, via a lubricating oil circulation line. An oil pump and an oil filter are interposed in the lubricating oil circulation line, and the lubricating oil of which impurities are filtered by the oil filter is fed from the oil pan to the lubricating oil tank via the lubricating oil circulation line by the oil pump. In addition, the lubricating oil is supplied from the lubricating oil tank to the first supply passage 41.

The lubricating oil supplied to the first supply passage 41 is led to the third supply passage 43, the fourth supply passage 44, the fifth supply passage 45, and the sixth supply passage 46 via the second supply passage 42. The lubricating oil led to the third supply passage 43 is supplied to the outer peripheral surface 21b of the journal bearing 21. In addition, the lubricating oil led to the fourth supply passage 44 is supplied to the outer peripheral surface 22b of the journal bearing 22. Moreover, the lubricating oil led to the sixth supply passage 46 is fed to the space portion 16A of the bearing accommodating portion 16 and is attached to the spiral grooves 61 and 62 formed on the outer peripheral surface 14a of the rotary shaft 14 accommodated in the space portion 16A. The rotary shaft 14 rotates at a high speed, and thus, the lubricating oil attached to the spiral grooves 61 and 62 is fed in spiral directions of the spiral grooves 61 and 62 according to the rotation of the rotary shaft 14. The lubricating oil fed in the directions of the spiral grooves 61 and 62 on the outer peripheral surface 14a of the rotary shaft 14 is supplied to each of the inner peripheral surfaces 21c and 22c of the journal bearings 21 and 22. In addition, the lubricating oil led to the fifth supply passage 45 is supplied to the passage 23b of the thrust bearing 23.

In the journal bearing 21, as described above, the lubricating oil is supplied to each of the outer peripheral surface 21b and the inner peripheral surface 21c. Accordingly, the journal bearing 21 is rotatably supported by the bearing accommodating portion 16 using the lubricating oil supplied to a portion between the outer peripheral surface 21b and the inner peripheral surface 16a of the bearing accommodating portion 16, and rotatably supports the rotary shaft 14 by the lubricating oil supplied to a portion between the inner peripheral surface 21c and the outer peripheral surface 14a of the rotary shaft 14.

In the journal bearing 21, the lubricating oil supplied to the outer peripheral surface 21b side and the inner peripheral surface 21c side flows from the passage 16b of the bearing accommodating portion 16 toward a lower portion of the third space portion S3 on the compressor 13 side. Meanwhile, in the journal bearing 21, the lubricating oil supplied to the outer peripheral surface 21b side and the inner peripheral surface 21c side flows to the side surface portion 21d side on the turbine 12 side, is fed to a radially outer side by a centrifugal force of the rotation of the rotary shaft 14 in the facing portion 24aa of the facing boss portion 24a so as to reach the oil discharge space chamber 47 on an outer peripheral portion of the boss portion 24a, and flows from the oil discharge space chamber 47 to the lower portion of the third space portion S3.

In the journal bearing 22, as described above, the lubricating oil is supplied to each of the outer peripheral surface 22b and the inner peripheral surface 22c. Accordingly, the journal bearing 22 is rotatably supported by the bearing accommodating portion 16 using the lubricating oil supplied to the portion between the outer peripheral surface 22b and the inner peripheral surface 16a of the bearing accommodating portion 16, and the journal bearing 22 rotatably supports the rotary shaft 14 by the lubricating oil supplied to the portion between the inner peripheral surface 22c and the outer peripheral surface 14a of the rotary shaft 14.

In the journal bearing 22, the lubricating oil supplied to the outer peripheral surface 22b side and the inner peripheral surface 22c side flows from the passage 16b of the bearing accommodating portion 16 toward a lower portion of the third space portion S3 on the turbine 12 side. Meanwhile, in the journal bearing 22, the lubricating oil supplied to the outer peripheral surface 22b side and the inner peripheral surface 22c side flows to the side surface portion 22d side on the compressor 13 side, is fed to a radially outer side by the centrifugal force of the rotation of the rotary shaft 14 in the facing portion 17bb of the flange portion 17b of the facing thrust ring 17, and flows to the lower portion of the third space portion S3 through a clearance 48.

In the thrust bearing 23, the lubricating oil supplied to the insertion hole 23a is led to portions between the respective plate surfaces 23c and 23d of the thrust bearing 23 and the respective facing portions 17ba and 18ba of the flange portions 17b and 18b. Accordingly, the thrust bearing 23 decreases a friction resistance between the facing portions 17ba and 18ba by the lubricating oil supplied to the portion between the respective facing portions 17ba and 18ba of the flange portions 17b and 18b while restricting the axial movement of the rotary shaft 14 between the facing portions 17ba and 18ba.

In the thrust bearing 23, on the facing portion 18ba side of the flange portion 18b of the thrust sleeve 18, the lubricating oil is fed to the radially outer side by the centrifugal force of the rotation of the rotary shaft 14, a portion of the lubricating oil flows to the lower portion of the third space portion S3 on the lower side of the flange portion 18b along an outer peripheral portion of the flange portion 18b, and a portion of the lubricating oil reaches the oil storage space 19a of the oil storage portion 19. The oil storage portion 19 includes a tongue piece 19b which extends from the lower side of the oil storage portion 19, and the oil storage space 19a is formed around the rotary shaft 14 and communicates with the lower portion of the third space portion S3 via the tongue piece 19b. Accordingly, the lubricating oil which has reached the oil storage space 19a flows to the lower portion of the third space portion S3 along the tongue piece 19b. Meanwhile, in the thrust bearing 23, on the facing portion 17ba side of the flange portion 17b of the thrust ring 17, the lubricating oil is fed to the radially outer side by the centrifugal force of the rotation of the rotary shaft 14. The clearance 48 is formed between the outer peripheral portion of the flange portion 17b and the bearing housing 15C, and the clearance 48 communicates with the lower portion of the third space portion S3. Accordingly, the lubricating oil fed to the radially outer side on the facing portion 17ba side flows to the lower portion of the third space portion S3 through the clearance 48.

In addition, the lubricating oil which has flowed from each location to the lower portion of the third space portion S3 is fed to the oil pan via the lubricating oil discharge pipe (not shown).

Figure 3:
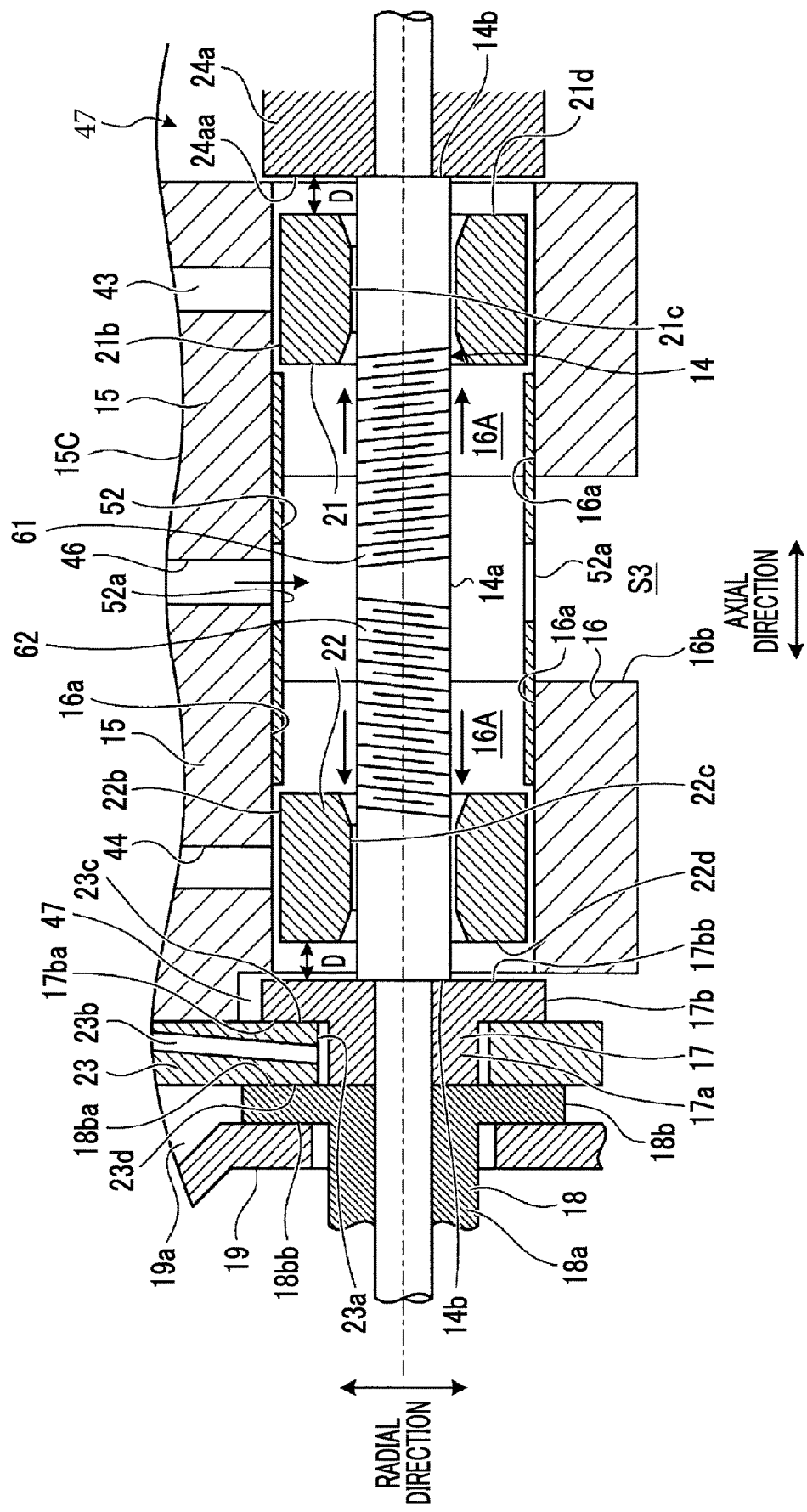
FIG. 3 is a schematic view showing a lubricating device for a bearing of a first modification example of the first embodiment.

In addition, a configuration of the bearing device is not limited to the above-described configuration. FIG. 3 is a schematic view showing a lubricating device for a bearing of a first modification example of the first embodiment, and FIG. 4 is a schematic view showing a lubricating device for a bearing of a second modification example of the first embodiment.

As shown in FIG. 3, in the lubricating device for a bearing, the journal bearings 21 and 22 are configured to be separated from each other. In addition, a tubular member 52 is accommodated in the space portion 16A of the bearing accommodating portion 16 which communicates with the sixth supply passage 46. The tubular member 52 is a cylindrical member having both ends opening in the axial direction and the rotary shaft 14 is inserted into the tubular member 52. In addition, opening ends of the tubular member 52 face the journal bearings 21 and 22 and the tubular member 52 is disposed between the journal bearings 21 and 22. In addition, the tubular member 52 includes a through-hole 52a which penetrates the tubular member 52 in the radial direction such that the tubular member 52 communicates with the sixth supply passage 46. A plurality of through-holes 52a are formed in the tubular member 52 in the circumferential direction. The tubular member 52 may be fixed to the bearing accommodating portion 16, or may be rotatably provided in the space portion 16A without being fixed. In a case where the tubular member 52 is fixed to the bearing accommodating portion 16, at least the through-hole 52a which communicates with the sixth supply passage 46 which is the intermediate portion lubricating oil supply passage and the through-hole 52a which communicates with the lower portion of the third space portion S3 are formed. In addition, an opening area of each of the through-holes 52a is smaller than an opening area of the passage 16b communicating with the lower portion of the third space portion S3 in the bearing accommodating portion 16.

Accordingly, the lubricating oil fed to the space portion 16A of the bearing accommodating portion 16 from the sixth supply passage 46 passes through the through-holes 52a of the tubular member 52 and is attached to the spiral grooves 61 and 62 formed on the outer peripheral surface 14a of the rotary shaft 14. The lubricating oil attached to the spiral grooves 61 and 62 is fed to the spiral directions of the spiral grooves 61 and 62 according to the rotation of the rotary shaft 14, and is supplied to each of the inner peripheral surfaces 21c and 22c of the respective journal bearings 21 and 22.

Figure 4:
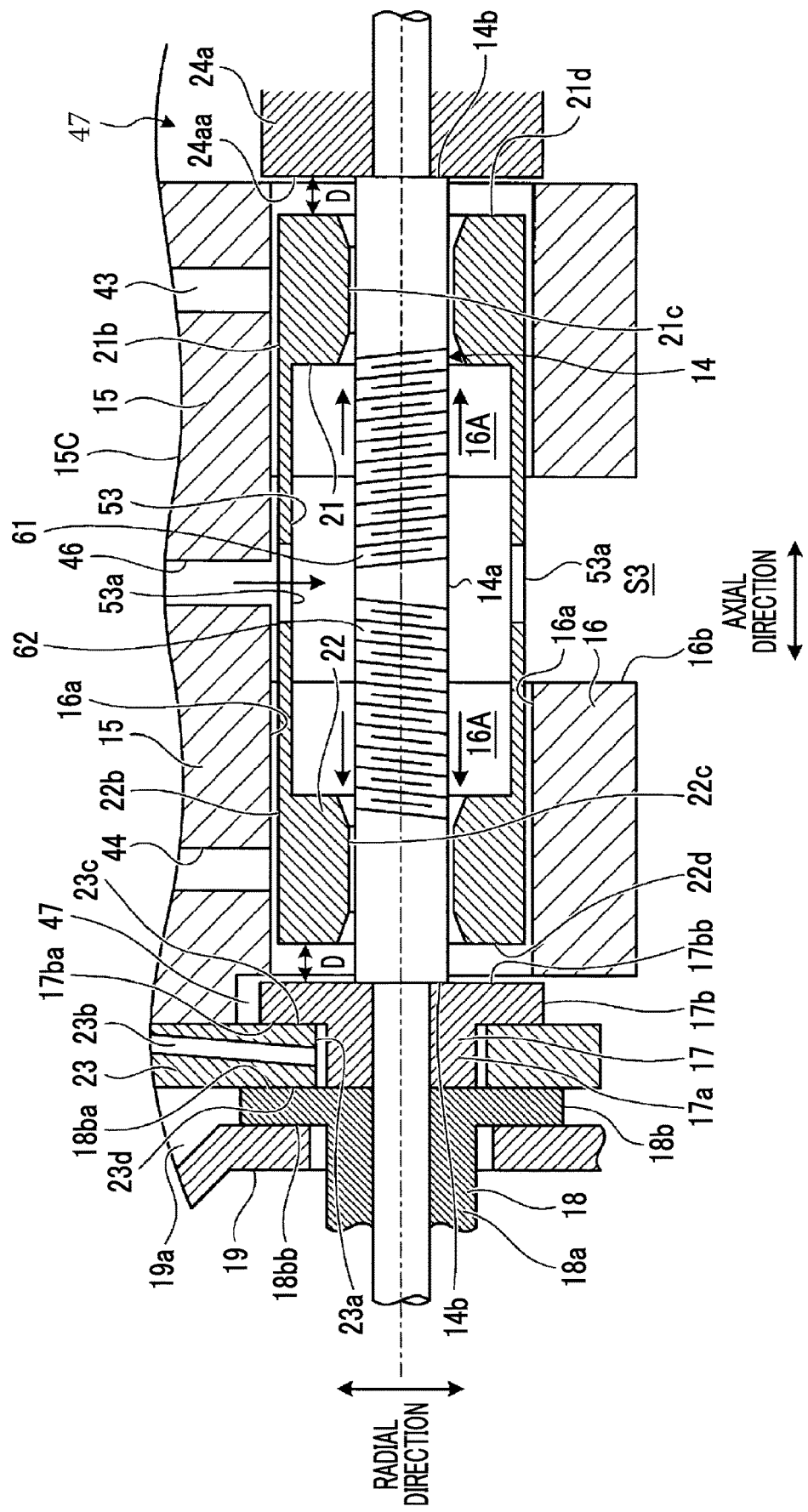
FIG. 4 is a schematic view showing a lubricating device for a bearing of a second modification example of the first embodiment.

In addition, as shown in FIG. 4, in the lubricating device for a bearing, the journal bearings 21 and 22 are provided to be connected to each other. The respective journal bearings 21 and 22 are connected by a connection portion 53. For example, the connection portion 53 is a tubular member, a plurality of rod-shaped members, or the like. In a case of the tubular member, as shown in FIG. 4, a through-hole 53a penetrating the tubular member in the radial direction is formed such that the tubular member communicates with the sixth supply passage 46 which is the intermediate portion lubricating oil supply passage. A plurality of through-holes 53a are formed in a circumferential direction of the connection portion 53 which is the tubular member. In addition, an opening area of each of the through-holes 53a is smaller than the opening area of the passage 16b communicating with the lower portion of the third space portion S3 in the bearing accommodating portion 16.

Accordingly, the lubricating oil fed to the space portion 16A of the bearing accommodating portion 16 from the sixth supply passage 46 is attached to the spiral grooves 61 and 62 formed on the outer peripheral surface 14a of the rotary shaft 14 through the through-holes 53a of the connection portion 53. The lubricating oil attached to the spiral grooves 61 and 62 is fed in the spiral directions of the spiral grooves 61 and 62 according to the rotation of the rotary shaft 14 and is supplied to each of the inner peripheral surfaces 21c and 22c of the respective journal bearings 21 and 22.

In the lubricating device for a bearing of the first embodiment, in the bearing device 36 including the housing 15 having a hollow shape and the journal bearings 21 and rotatably supporting the rotary shaft 14 disposed inside the housing 15, the third supply passage 43 and the fourth supply passage 44 through which the lubricating oil is supplied to the outer peripheral surfaces 21b and 22b of the journal bearings 21 and 22, the sixth supply passage 46 through which the lubricating oil is supplied to the space portion 16A between the journal bearings 21 and 22, and the guide portion which guides the lubricating oil supplied from the sixth supply passage 46 to the space portion 16A toward the inner peripheral surfaces 21c and 22c of the journal bearings 21 and 22.

Accordingly, the lubricating oil is supplied to the outer peripheral surfaces 21b and 22b of the journal bearings 21 and 22 through the third supply passage 43 and the fourth supply passage 44, is supplied to the space portion 16A between the journal bearings 21 and 22 through the sixth supply passage 46, and is supplied to the inner peripheral surfaces 21c and 22c of the journal bearings 21 and 22 by the guide portion. Accordingly, the lubricating oil is separately supplied to the outer peripheral surfaces 21b and 22b and the inner peripheral surfaces 21c and 22c of the journal bearings 21 and 22 from the supply passages 43, 44, and 46, respectively, and thus, it is possible to supply an appropriate amount of lubricating oil without excess or deficiency. In this case, the lubricating oil supplied to the space portion 16A between the journal bearings 21 and 22 is supplied to the inner peripheral surfaces 21c and 22c of the journal bearings 21 and 22 by the guide portion, and thus, it is possible to supply a stable amount of lubricating oil to the journal bearings 21 and 22 regardless of the rotation speed of the rotary shaft 14.

In this case, the journal bearings 21 and 22 is configured such that the outer peripheral surfaces 21b and 22b and the inner peripheral surfaces 21c and 22c do not communicate with each other. Accordingly, it is possible to prevent a force by which the lubricating oil is returned from the inner peripheral surfaces 21c and 22c sides of the journal bearings 21 and 22 to the outer peripheral surface 21b and 22b sides thereof from being applied by a centrifugal force generated when the rotary shaft 14 is rotated at a high speed, and thus, it is possible to prevent the amount of the lubricating oil from decreasing on the inner peripheral surfaces 21c and 22c of the journal bearings 21 and 22. In addition, in a case where the applied centrifugal force when the rotary shaft is rotated is small, a communication hole for lubricating oil (not shown) which communicate with the outer peripheral surfaces 21b and 22b and the inner peripheral surfaces 21c and 22c of the journal bearings 21 and 22 may be provided. Moreover, in a case where the communication hole for lubricating oil is provided, preferably, the communication hole for lubricating oil has a hole diameter so as not to be affected by the centrifugal force when the rotary shaft 14 is rotated.

In the lubricating device for a bearing of the first embodiment, the guide portion is provided on the outer peripheral surface 14a of the rotary shaft 14. Specifically, as the guide portion, the plurality of spiral grooves 61 and 62 provided on the outer peripheral surface 14a of the rotary shaft 14 are provided, and the plurality of spiral grooves 61 and 62 are provided to be turned in the reverse direction from the position, at which the sixth supply passage 46 communicates with the space portion 16A, toward the respective journal bearings 21 and 22. Accordingly, the lubricating oil which is supplied to the space portion 16A through the sixth supply passage 46 and is attached to the rotary shaft 14 can be easily supplied to the inner peripheral surfaces 21c and 22c of the respective journal bearings 21 and 22 by the respective spiral grooves 61 and 62. In addition, a separate member constituting the guide portion is not required, and it is possible to suppress complication of a structure and an increase in a cost.

In the lubricating device for a bearing of the first embodiment, the tubular member 52 having the through-hole 52a communicating with the sixth supply passage 46 is disposed between the journal bearings 21 and 22, which are configured to be separated from each other, in the space portion 16A of the bearing accommodating portion 16. Accordingly, it is possible to reliably to supply the lubricating oil to the portions between the inner peripheral surfaces 21c and 22c of the respective journal bearings 21 and 22 and the outer peripheral surface 14a of the rotary shaft 14 through the tubular member 52. In addition, if the through-hole 52a is formed to have the opening area which is smaller than that of the passage 16b of the bearing accommodating portion 16 communicating with the lower portion of the third space portion S3, the amount of the lubricating oil discharged to the lower portion of the third space portion S3 is limited, and thus, it is possible to reliably supply the lubricating oil to the portions between the inner peripheral surfaces 21c and 22c of the journal bearings 21 and 22 and the outer peripheral surface 14a of the rotary shaft 14.

In the lubricating device for a bearing of the first embodiment, the journal bearings 21 and 22 are connected to each other by the connection portion 53. In addition, the case where the connection portion 53 is a tubular member, it is possible to reliably supply the lubricating oil to the portions between the inner peripheral surfaces 21c and 22c of the journal bearings 21 and 22 and the outer peripheral surface 14a of the rotary shaft 14 via the tubular member. Moreover, in a case where the connection portion 53 is the tubular member and the through-holes 53a penetrating the tubular member in the radial direction are formed such that the tubular member communicates with the sixth supply passage 46, if the opening areas of the through-holes 53a are formed to be smaller than the opening area of the passage 16b of the bearing accommodating portion 16 communicating with the lower portion of the third space portion S3, the amount of the lubricating oil discharged to the lower portion of the third space portion S3 is limited, and thus, it is possible to reliably supply the lubricating oil to the portions between the inner peripheral surfaces 21c and 22c of the journal bearings 21 and 22 and the outer peripheral surface 14a of the rotary shaft 14.

In addition, the exhaust turbine turbocharger of the first embodiment includes the turbine 12, the compressor 13, the rotary shaft 14 which coaxially connects the turbine 12 and the compressor 13, the bearing device 36 having the journal bearings 21 and 22 which rotatably supports the rotary shaft 14, and the lubricating device 37 of the journal bearings 21 and 22.

Accordingly, in the journal bearings 21 and 22 supporting the rotary shaft 14, the lubricating oil is separately supplied from the supply passages 43, 44, and 46 to the outer peripheral surfaces 21b and 22b and the inner peripheral surfaces 21c and 22c, respectively, and thus, it is possible to supply an appropriate amount of lubricating oil without excess or deficiency. In this case, the lubricating oil supplied to the space portion 16A between the journal bearings 21 and 22 is supplied to the inner peripheral surfaces 21c and 22c of the journal bearings 21 and 22 by the guide portion, and thus, it is possible to supply a stable amount of lubricating oil to the journal bearings 21 and 22 regardless of the rotation speed of the rotary shaft 14.

Second Embodiment

Figure 5:
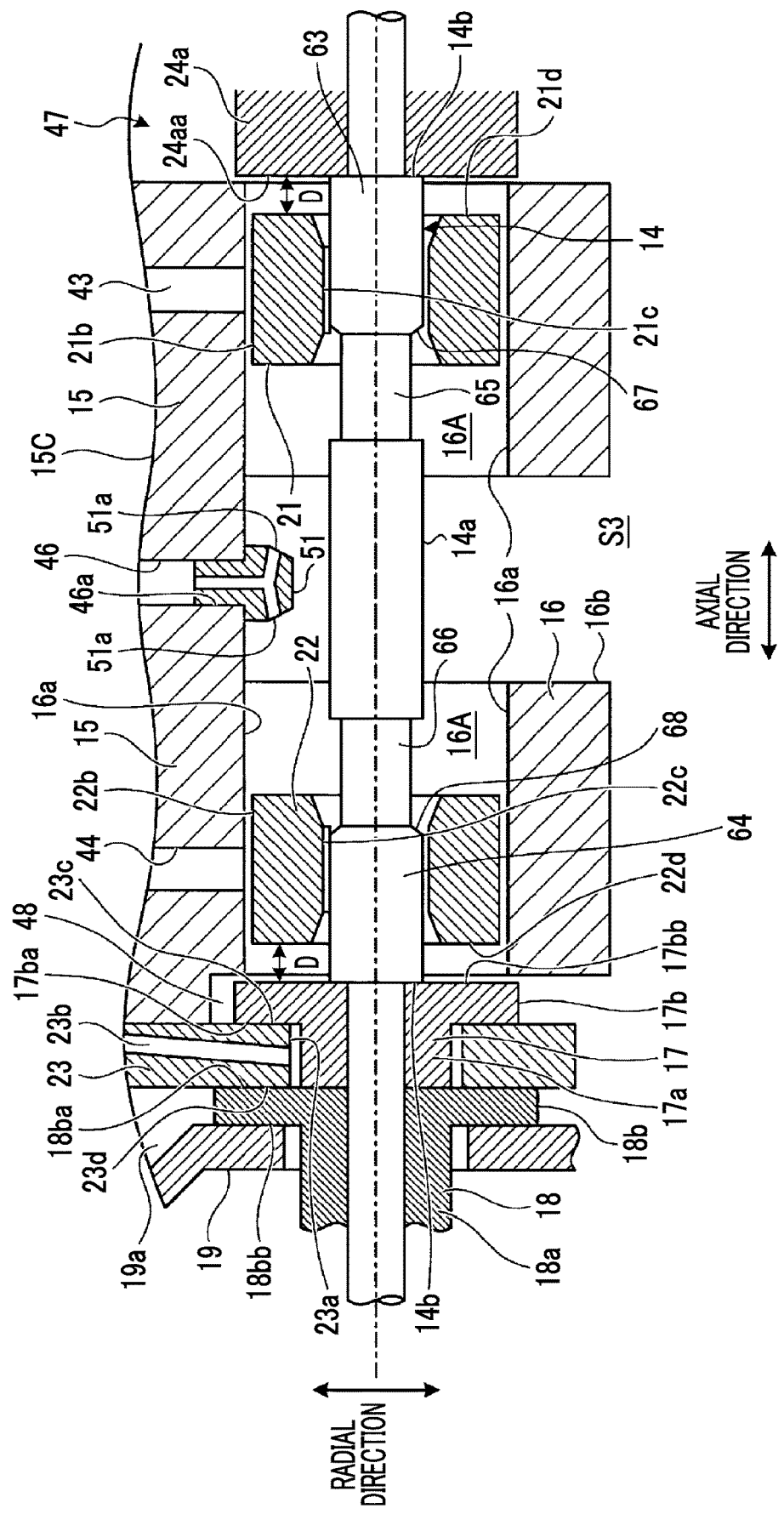
FIG. 5 is a schematic view showing a lubricating device for a bearing of an exhaust turbine turbocharger according to a second embodiment.

FIG. 5 is a schematic view showing a lubricating device for a bearing of an exhaust turbine turbocharger according to a second embodiment. Moreover, the same reference numerals are assigned to members having the functions similar to those of the above-described embodiment, and detail descriptions thereof are omitted.

As shown in FIG. 5, in the second embodiment, the lubricating device is configured to include the third supply passage 43 which communicates with the journal bearing 21, the fourth supply passage 44 which communicates with the journal bearing 22, and the sixth supply passage 46 which communicates with the space portion 16A of the bearing accommodating portion 16. The tip portion of the sixth supply passage 46 communicates with the space portion 16A of the bearing accommodating portion 16 between the two journal bearings 21 and 22. The sixth supply passage 46 includes a nozzle 51 which is provided in a discharge port 46a which communicates with the space portion 16A. The nozzle 51 includes an injection port 51a which faces each of the journal bearings 21 and 22. At least one injection port 51a may be provided for each of the journal bearings 21 and 22, or a plurality of injection ports 51a may be provided. In addition, preferably, the injection port 51a is provided toward the outer peripheral surface 14a of the rotary shaft 14 around the journal bearings 21 and 22 such that the lubricating oil is distributed to the portions between the inner peripheral surfaces 21c and 22c of the respective journal bearings 21 and 22 and the outer peripheral surface 14a of the rotary shaft 14.

In addition, the lubricating device includes a guide portion which guides the lubricating oil, which is supplied from the sixth supply passage 46 to the space portion 16A, to the inner peripheral surfaces 21c and 22c of the journal bearings 21 and 22. The rotary shaft 14 includes large-diameter portions 63 and 64 which are supported by the journal bearings 21 and 22, and small-diameter portions 65 and 66 which are positioned between the journal bearings 21 and 22. In this case, the two small-diameter portions 65 and 66 may be connected to each other. In the present embodiment, the guide portion is guide surfaces 67 and 68 which are provided on the outer peripheral surface 14a of the rotary shaft 14 and are inclined from the center side of the rotary shaft 14 toward the outer peripheral surface 14a side.

The guide surfaces 67 and 68 are inclined on the end portions of the small-diameter portions 65 and 66 on the journal bearings 21 and 22 sides from the outer peripheral surfaces of the small-diameter portions 65 and 66 toward the outer peripheral surfaces of the large-diameter portions 63 and 64. This inclination angle is set so as to form a ring shape which is inclined to the axial direction of the rotary shaft 14 and the radial direction of the rotary shaft 14. In this case, preferably, at least a portion of the guide surfaces 67 and 68 is provided at a position of overlapping the inner peripheral surfaces 21c and 22c of the journal bearings 21 and 22 in the radial direction, but may not be provided at the overlapping position.

Therefore, the lubricating oil fed from the sixth supply passage 46 to the space portion 16A of the bearing accommodating portion 16 is injected from the respective injection ports 51a of the nozzle 51 toward the small-diameter portions 65 and 66 of the rotary shaft 14. The lubricating oil injected to the small-diameter portions 65 and 66 flows in the axial direction along the small-diameter portions 65 and 66 by an injection force, and is supplied to each of the inner peripheral surfaces 21c and 22c of the journal bearings 21 and 22 by the guide surfaces 67 and 68.

In this way, in the lubricating device for a bearing of the second embodiment, as the guide portion which guides the lubricating oil, which is supplied from the sixth supply passage 46 to the space portion 16A, to the inner peripheral surfaces 21c and 22c of the journal bearings 21 and 22, the guide surfaces 67 and 68 which are inclined from the center sides of the guide surfaces toward the outer peripheral surface 14a side are provided on the outer peripheral surface 14a of the rotary shaft 14.

Accordingly, the lubricating oil is supplied to the space portion 16A between the journal bearings 21 and 22 through the sixth supply passage 46 and is supplied to the inner peripheral surfaces 21c and 22c of the journal bearings 21 and 22 by the guide surfaces 67 and 68. Accordingly, the journal bearings 21 and 22 supplies an appropriate amount of lubricating oil without excess or deficiency, and thus, it is possible to supply a stable amount of lubricating oil to the journal bearings 21 and 22 regardless of the rotation speed of the rotary shaft 14.

In the lubricating device for a bearing of the second embodiment, in the rotary shaft 14, the large-diameter portions 63 and 64 which are supported by the journal bearings 21 and 22 and the small-diameter portions 65 and 66 which are positioned between the journal bearings 21 and 22 are provided, and the guide surfaces 67 and 68 are inclined from the outer peripheral surfaces of the small-diameter portions 65 and 66 toward the outer peripheral surfaces of the large-diameter portions 63 and 64. Accordingly, the lubricating oil supplied to the space portion 16A can be easily supplied from the outer peripheral surfaces of the small-diameter portions 65 and 66 to the large-diameter portions 63 and 64 and the inner peripheral surfaces 21c and 22c of the journal bearings 21 and 22 via the guide surfaces 67 and 68.

In the lubricating device for a bearing of the second embodiment, in the sixth supply passage 46, the nozzle 51 is provided in the discharge port 46a which communicates with the space portion 16A. Accordingly, the lubricating oil is injected to the journal bearings 21 and 22 by the nozzle 51, and thus, it is possible to reliably supply the lubricating oil to the portions between the inner peripheral surfaces 21c and 22c of the journal bearings 21 and 22 and the outer peripheral surface 14a of the rotary shaft 14.

Third Embodiment

Figure 6:
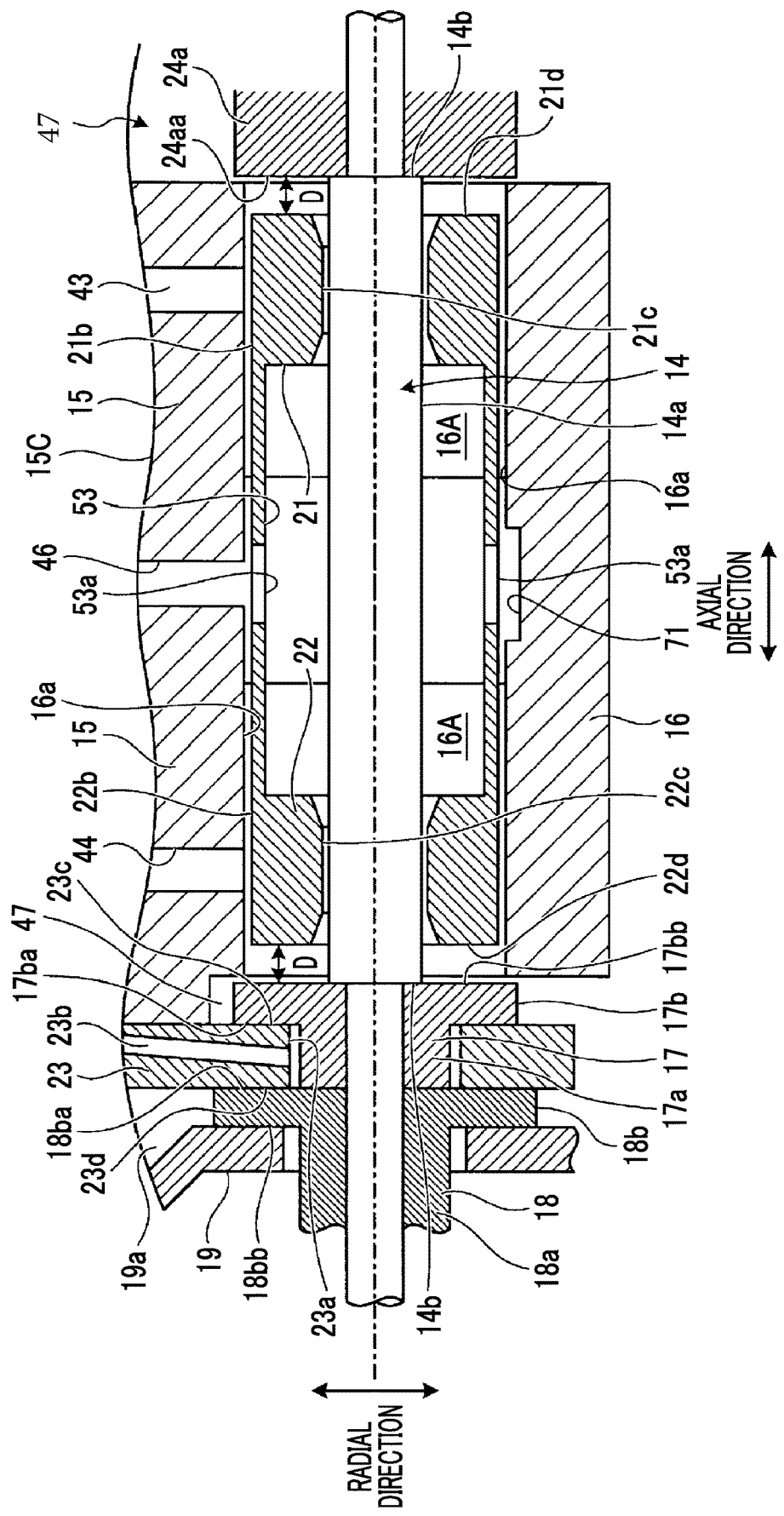
FIG. 6 is a schematic view showing a lubricating device for a bearing of an exhaust turbine turbocharger according to a third embodiment.

FIG. 6 is a schematic view showing a lubricating device for a bearing of an exhaust turbine turbocharger according to a third embodiment. In addition, the same reference numerals are assigned to members having the functions similar to those of the above-described embodiments, and detail descriptions thereof are omitted.

As shown in FIG. 6, in the third embodiment, the lubricating device is configured to include the third supply passage 43 which communicates with the journal bearing 21, the fourth supply passage 44 which communicates with the journal bearing 22, and the sixth supply passage 46 which communicates with the space portion 16A of the bearing accommodating portion 16. The tip portion of the sixth supply passage 46 communicates with the space portion 16A of the bearing accommodating portion 16 between the two journal bearings 21 and 22. Meanwhile, the journal bearings 21 and 22 are provided to be connected to each other by the connection portion 53. In the connection portion 53, the through-hole 53a which penetrates the connection portion 53 in the radial direction is formed so as to communicate with the sixth supply passage 46.

In addition, the lubricating device includes a guide portion which guides the lubricating oil, which is supplied from the sixth supply passage 46 to the space portion 16A, to the inner peripheral surfaces 21c and 22c of the journal bearings 21 and 22. In the present embodiment, the guide portion is a recessed portion 71 which is provided on the vertically lower inner peripheral surface 16a of the housing 15 facing the space portion 16A of the bearing accommodating portion 16. In the present embodiment, in the bearing accommodating portion 16, the passage 16b (refer to FIG. 2) communicating with the lower portion of the third space portion S3 between the journal bearings 21 and 22 is not formed, and the lower portion is closed. The recessed portion 71 is provided on the inner peripheral surface 16a of the bearing accommodating portion 16 at the position facing the through-hole 53a formed in the connection portion 53 at the axial positions of the journal bearings 21 and 22, and the recessed portion 71 is provided to have a predetermined angle (for example, 180° or less) on the inner peripheral surface 16a.

Therefore, the lubricating oil, which is fed from the sixth supply passage 46 to the space portion 16A of the bearing accommodating portion 16, reaches the rotary shaft 14 through the through-hole 53a of the connection portion 53. Here, the lower portion of the bearing accommodating portion 16 is closed, and thus, the lubricating oil is stored in the bearing accommodating portion 16 including the recessed portion 71 and flows the respective journal bearings 21 and 22 according to the rotation of the rotary shaft 14. Accordingly, the lubricating oil is supplied to each of the inner peripheral surfaces 21c and 22c of the respective journal bearings 21 and 22.

Figure 7:
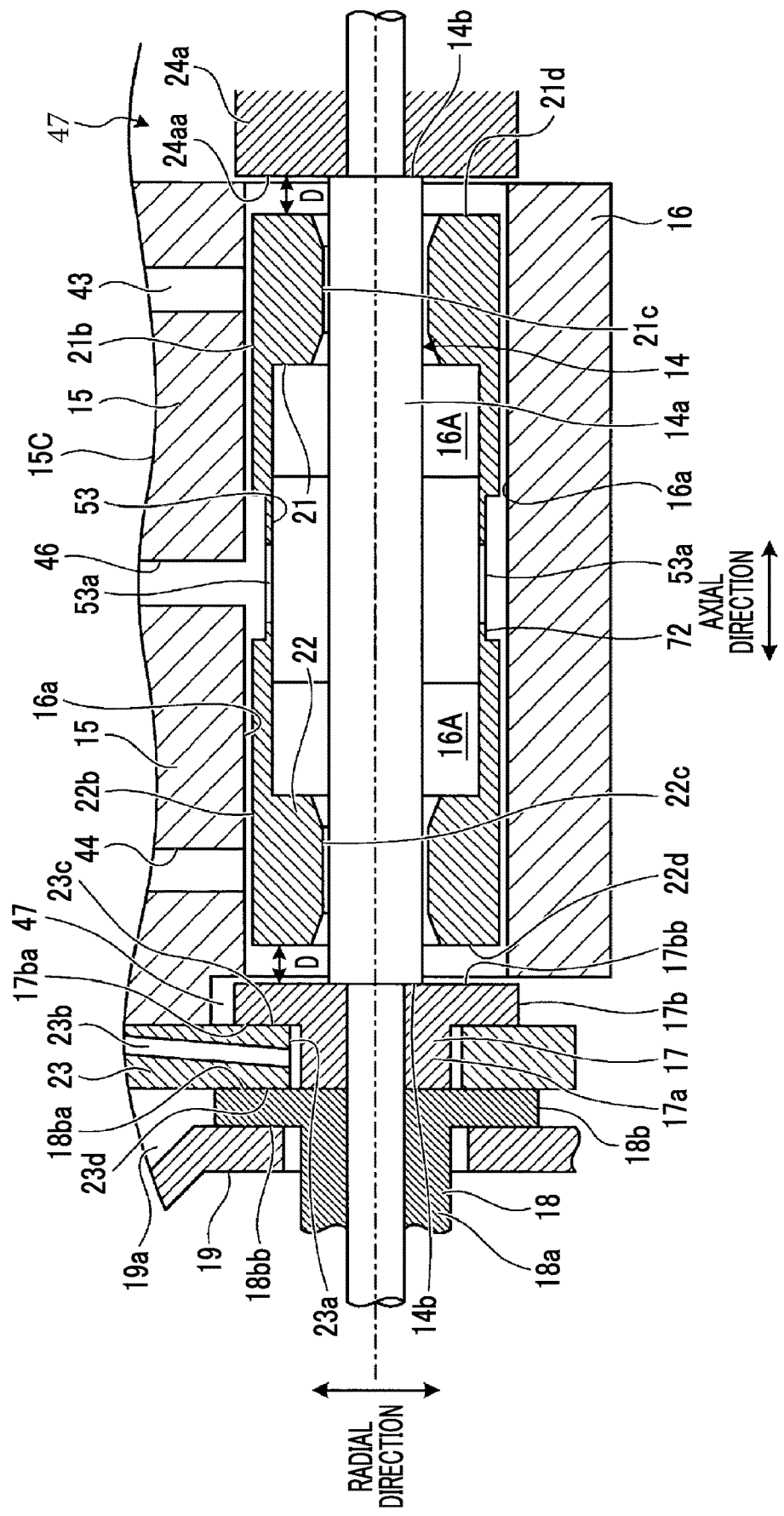
FIG. 7 is a schematic view showing a lubricating device for a bearing of a first modification example of the third embodiment.

In addition, a configuration of the guide portion is not limited to the above-described configuration. FIG. 7 is a schematic view showing a lubricating device for a bearing of a first modification example of the third embodiment, and FIG. 8 is a schematic view showing a lubricating device for a bearing of a second modification example of the third embodiment.

As shown in FIG. 7, the lubricating device includes a guide portion which guides the lubricating oil, which is supplied from the sixth supply passage 46 to the space portion 16A, to the inner peripheral surfaces 21c and 22c of the journal bearings 21 and 22. In the present embodiment, the guide portion is a recessed portion 72 which communicates with the plurality of through-holes 53a and is provided to face the inner peripheral surface 16a of the bearing accommodating portion 16 in the housing 15. In the present embodiment, in the bearing accommodating portion 16, the passage 16b (refer to FIG. 2) communicating with the lower portion of the third space portion S3 between the journal bearings 21 and 22 is not formed, and the lower portion is closed. The recessed portion 72 is provided on the outer peripheral surface of the connection portion 53 at approximately the same position as that of the through-hole 53a formed in the connection portion 53 in the axial positions of the journal bearings 21 and 22, and the recessed portion 72 is provided on the outer peripheral surface to have a predetermined angle (for example, 180° or less).

Figure 8:
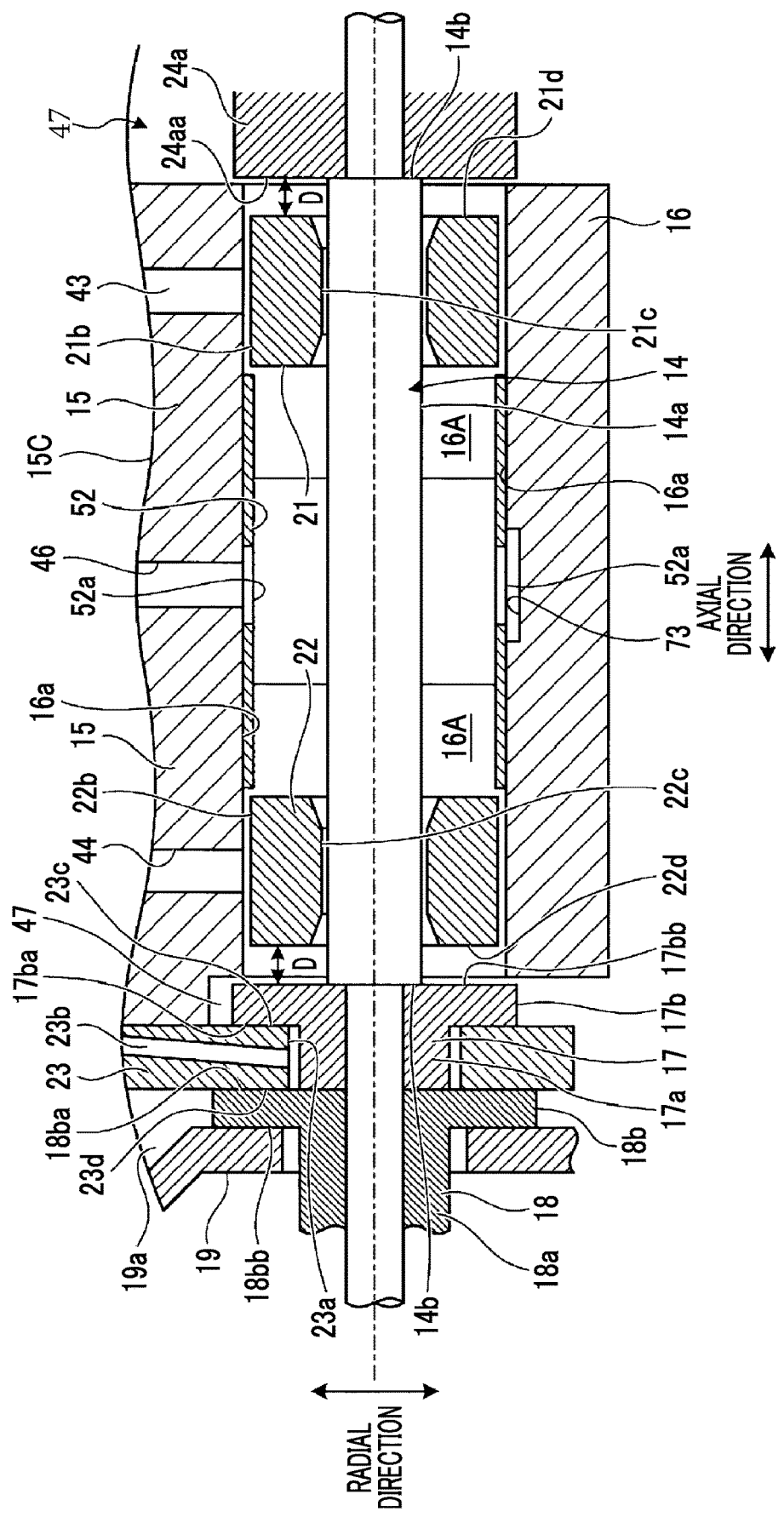
FIG. 8 is a schematic view showing a lubricating device for a bearing of a second modification example of the third embodiment.

In addition, as shown in FIG. 8, the journal bearings 21 and 22 are configured to be separated from each other, and the tubular member 52 is accommodated in the space portion 16A of the bearing accommodating portion 16. The tubular member 52 includes the through-hole 52a which penetrates the tubular member 52 in the radial direction such that the tubular member 52 communicates with the sixth supply passage 46. The lubricating device includes a guide portion which guides the lubricating oil, which is supplied from the sixth supply passage 46 to the space portion 16A, to the inner peripheral surfaces 21c and 22c of the journal bearings 21 and 22. In the present embodiment, the guide portion is a recessed portion 73 which is provided on the vertically lower inner peripheral surface 16a of the housing 15 facing the space portion 16A of the bearing accommodating portion 16.

In this way, in the lubricating device for a bearing of the third embodiment, as the guide portions which guide the lubricating oil, which is supplied from the sixth supply passage 46 to the space portion 16A, to the inner peripheral surfaces 21c and 22c of the journal bearings 21 and 22, the recessed portions 71, 72, and 73 are provided on the inner peripheral surface 16a of the bearing accommodating portion 16 in the housing 15, the outer peripheral surface of the connection portion 53 of the journal bearings 21 and 22, or the outer peripheral surface of the tubular member 52 accommodated in the space portion 16A.

Accordingly, the lubricating oil is supplied to the space portion 16A between the journal bearings 21 and 22 through the sixth supply passage 46 and is supplied to the inner peripheral surfaces 21c and 22c of the journal bearings 21 and 22 by the recessed portions 71, 72, and 73. Therefore, an appropriate amount of lubricating oil is supplied to the journal bearings 21 and 22 without excess or deficiency, and it is possible to supply a stable amount of lubricating oil to the journal bearings 21 and 22 regardless of the rotation speed of the rotary shaft 14.

Fourth Embodiment

Figure 9:
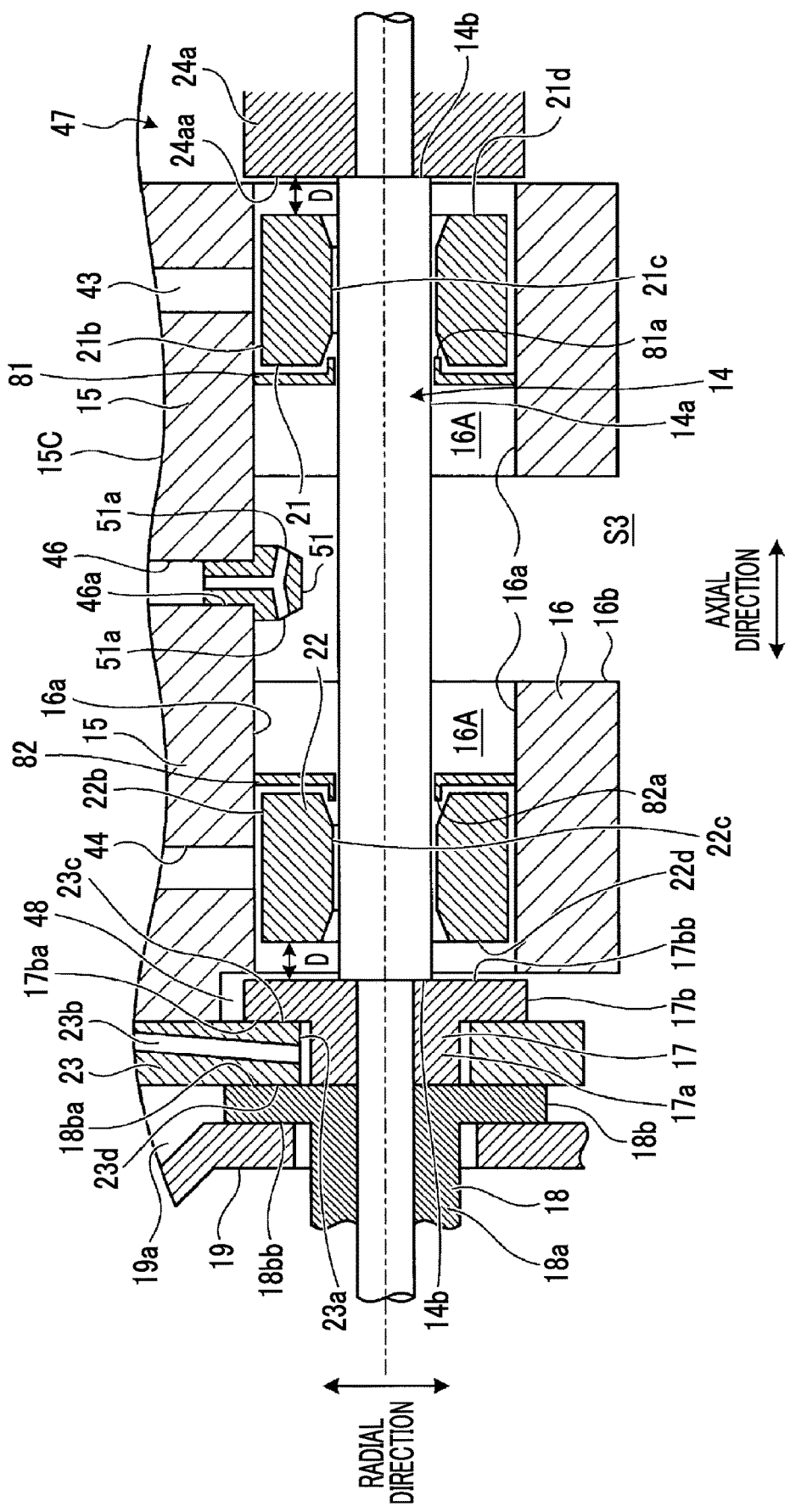
FIG. 9 is a schematic view showing a lubricating device for a bearing of an exhaust turbine turbocharger according to a fourth embodiment.

FIG. 9 is a schematic view showing a lubricating device for a bearing of an exhaust turbine turbocharger according to a fourth embodiment. Moreover, the same reference numerals are assigned to members having the functions similar to those of the above-described embodiments, and detail descriptions thereof are omitted.

As shown in FIG. 9, in the fourth embodiment, the lubricating device is configured to include the third supply passage 43 which communicates with the journal bearing 21, the fourth supply passage 44 which communicates with the journal bearing 22, and the sixth supply passage 46 which communicates with the space portion 16A of the bearing accommodating portion 16. The tip portion of the sixth supply passage 46 communicates with the space portion 16A of the bearing accommodating portion 16 between the two journal bearings 21 and 22. The sixth supply passage 46 includes the nozzle 51 which is provided in a discharge port 46a which communicates with the space portion 16A. The nozzle 51 includes an injection port 51a which faces each of the journal bearings 21 and 22.

In addition, the lubricating device includes a guide portion which guides the lubricating oil, which is supplied from the sixth supply passage 46 to the space portion 16A, to the inner peripheral surfaces 21c and 22c of the journal bearings 21 and 22. In the housing 15, stop rings 81 and 82 which restrict the movements of the journal bearings 21 and 22 in a direction approaching each other are provided on the inner peripheral surfaces 16a of the bearing accommodating portion 16 on sides on which the journal bearings 21 and 22 face each other. In the present embodiment, the guide portion is protrusion portions 81a and 82a which extend from inner peripheral portions of the stop rings 81 and 82 to the journal bearings 21 and 22 sides.

The stop rings 81 and 82 has a perforated disk shape, but has a C shape having an end portion in the circumferential direction. Outer peripheral portions of the stop rings 81 and 82 are locked to locking grooves (not shown) formed on the inner peripheral surface 16a of the bearing accommodating portion 16, and thus, the stop rings 81 and 82 cannot move in the axial direction, and the movements of the journal bearings 21 and 22 are restricted. In the stop rings 81 and 82, protrusion portions 81a and 82a extending the inner peripheral surfaces 21c and 22c sides of the journal bearings 21 and adjacent to the inner peripheral portions are integrally formed with the stop rings 81 and 82. Each of the protrusion portions 81a and 82a is provided the entire periphery of each of the stop rings 81 and 82 or a portion of the entire periphery thereof, or is provided with a predetermined gap. In addition, preferably, each of the protrusion portions 81a and 82a is provided at a position of overlapping each of the inner peripheral surfaces 21c and 22c of the journal bearings 21 and 22 in the radial direction, but may not be provided at the overlapping position.

Therefore, the lubricating oil fed from the sixth supply passage 46 to the space portion 16A of the bearing accommodating portion 16 is injected from the respective injection ports 51a of the nozzle 51 toward the outer peripheral surface 14a of the rotary shaft 14. The lubricating oil injected to the outer peripheral surface 14a of the rotary shaft 14 flows in the axial direction along the rotary shaft 14 by an injection force, and is supplied to each of the inner peripheral surfaces 21c and 22c of the journal bearings 21 and 22 by the protrusion portions 81a and 82a of the stop rings 81 and 82. That is, the lubricating oil is temporarily stored inside the protrusion portions 81a and 82a of the stop rings 81 and 82, and thus, the inner peripheral surfaces 21c and 22c of the journal bearings 21 and 22 are lubricated.

Figure 10:
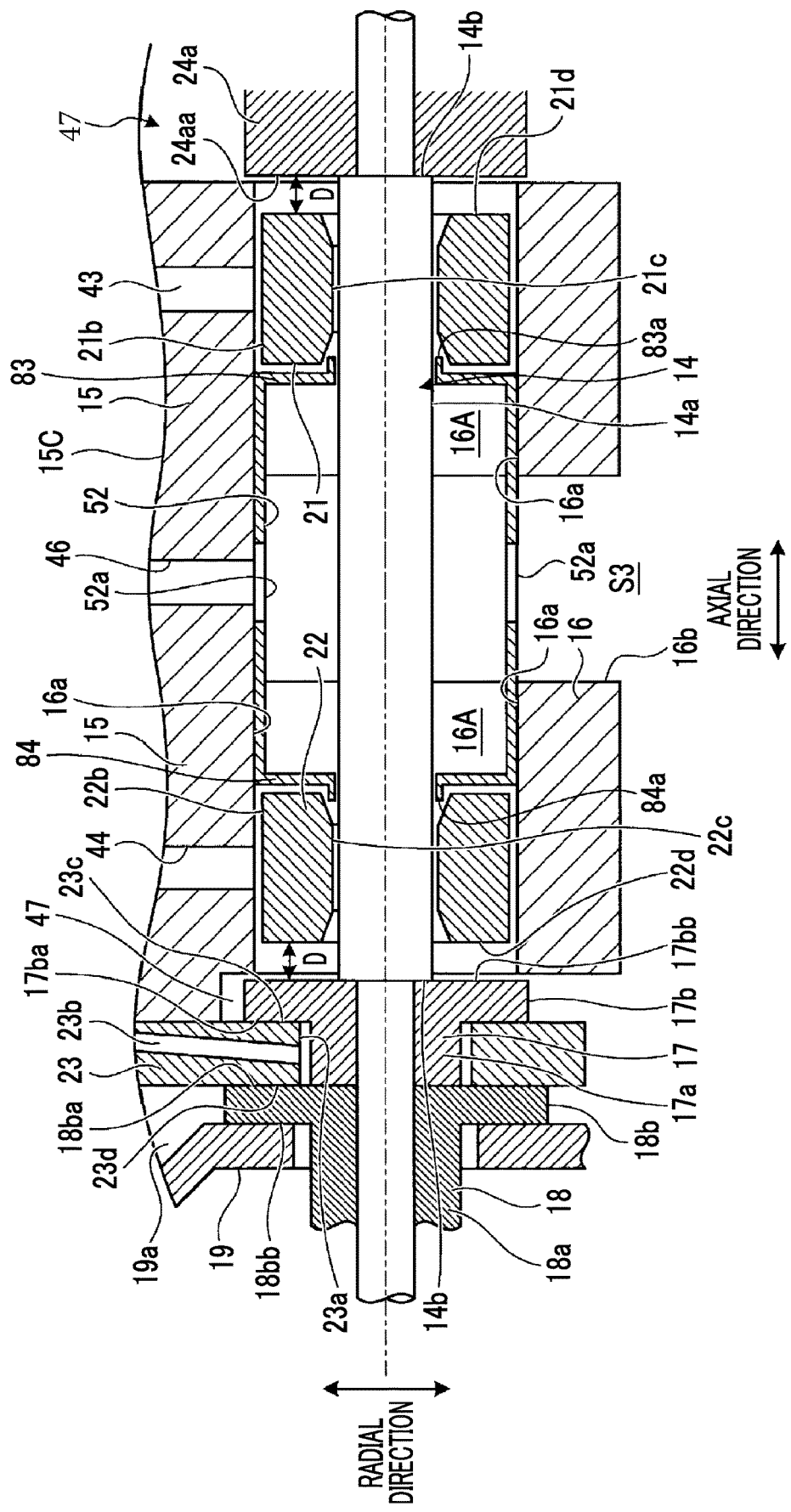
FIG. 10 is a schematic view showing a lubricating device for a bearing of a first modification example of the fourth embodiment.

In addition, a configuration of the guide portion is not limited to the above-described configuration. FIG. 10 is a schematic view showing a lubricating device for a bearing of a first modification example of the fourth embodiment.

As shown FIG. 10, the journal bearings 21 and 22 are configured to be separated from each other, and the tubular member 52 is accommodated in the space portion 16A of the bearing accommodating portion 16 which communicates with the sixth supply passage 46. In the tubular member 52, the through-hole 52a which penetrates the tubular member 52 in the radial direction is formed so as to communicate with the sixth supply passage 46.

The lubricating device includes a guide portion which guides the lubricating oil, which is supplied from the sixth supply passage 46 to the space portion 16A, to the inner peripheral surfaces 21c and 22c of the journal bearings 21 and 22. In the present embodiment, the guide portion is protrusion portions 83a and 84a which extend from disk members 83 and 84 provided on axial end portions of the tubular member 52 to the journal bearings 21 and 22 sides.

In the tubular member 52, outer peripheral portions of the disk members 83 and 84 are connected to the respective end portions in the axial direction. Inner peripheral portions of the disk members 83 and 84 are positioned around the outer peripheral surface 14a of the rotary shaft 14, and the protrusion portions 83a and 84a, which extend to the inner peripheral surfaces 21c and 22c sides of the journal bearings 21 and 22 adjacent to the inner peripheral portions of the disk members 83 and 84, are integrally formed. Each of the protrusion portions 83a and 84a is provided the entire periphery of each of the disk members 83 and 84 or a portion of the entire periphery thereof, or is provided with a predetermined gap. In addition, preferably, each of the protrusion portions 83a and 84a is provided at a position of overlapping each of the inner peripheral surfaces 21c and 22c of the journal bearings 21 and 22 in the radial direction, but may not be provided at the overlapping position.

In this way, in the lubricating device for a bearing of the fourth embodiment, as the guide portion which guides the lubricating oil, which is supplied from the sixth supply passage 46 to the space portion 16A, to the inner peripheral surfaces 21c and 22c of the journal bearings 21 and 22, the protrusion portions 81a and 82a of the stop rings 81 and 82 or the protrusion portions 83a and 84a of the tubular member 52 are provided.

Accordingly, the lubricating oil is supplied to the space portion 16A between the journal bearings 21 and 22 through the sixth supply passage 46, and is supplied to the inner peripheral surfaces 21c and 22c of the journal bearings 21 and 22 by the protrusion portions 81a, 82a, 83a, and 84a. Therefore, an appropriate amount of lubricating oil is supplied to the journal bearings 21 and without excess or deficiency, and it is possible to supply a stable amount of lubricating oil to the journal bearings 21 and 22 regardless of the rotation speed of the rotary shaft 14.

REFERENCE SIGNS LIST

11: exhaust turbine turbocharger
12: turbine
13: compressor
14: rotary shaft
15: housing
16: bearing accommodating portion
16A: space portion
21: journal bearing
21b: outer peripheral surface
21c: inner peripheral surface
22: journal bearing
22b: outer peripheral surface
22c: inner peripheral surface
36: bearing device
37: lubricating device
40: lubricating oil supply passage
41: first supply passage
42: second supply passage
43: third supply passage (outer peripheral portion lubricating oil supply passage)
44: fourth supply passage (outer peripheral portion lubricating oil supply passage)
45: fifth supply passage
46: sixth supply passage (intermediate portion lubricating oil supply passage)
51: nozzle 52: tubular member
52a: through-hole
61, 62: spiral groove (guide portion)
63, 64: large-diameter portion
65, 66: small-diameter portion
67, 68: guide surface (guide portion)
71, 72, 73: recessed portion (guide portion)
81, 82: stop ring
81a, 82a: protrusion portion (guide portion)
83, 84: disk member
83a, 84a: protrusion portion (guide portion)

The invention claimed is:

1. An oil passage that supplies a lubricating oil to a plurality of journal bearings provided in a housing having a hollow shape, the plurality of journal bearings rotatably supporting a rotary shaft disposed inside the housing at at least two locations in an axial direction of the rotary shaft, the oil passage comprising:
a plurality of outer peripheral portion lubricating oil supply passages through which a lubricating oil is supplied to outer peripheral surfaces of the plurality of journal bearings;
an intermediate portion lubricating oil supply passage through which the lubricating oil is supplied to a space portion between the plurality of journal bearings; and
a guide portion which guides the lubricating oil, which is supplied from the intermediate portion lubricating oil supply passage to the space portion, to inner peripheral surfaces of the plurality of journal bearings,
wherein the lubricating oil is supplied to the outer peripheral surfaces and the inner peripheral surfaces of the plurality of journal bearings,
wherein each of the plurality of journal bearings is accommodated in an accommodating portion defined by an inner peripheral surface of the housing, and is rotatable inside the accommodating portion about a rotating shaft of the rotary shaft,
wherein an inner peripheral surface of each of the plurality of journal bearings rotatably supports the rotary shaft,
wherein said each of the plurality of journal bearings defines no oil flow passage extending inside said each of the plurality of journal bearings between an outer peripheral surface and the inner peripheral surface of said each of the plurality of journal bearings,
wherein the guide portion is provided on an outer peripheral surface of the rotary shaft,
the plurality of journal bearings includes a first journal bearing and a second journal bearing,
wherein the first journal bearing has a first side surface portion and a second side surface portion both of which extend in a radial direction of the rotary shaft, the second side surface portion is positioned nearer to the intermediate portion lubricating oil supply passage than the first side surface portion, and a first notch, which is tapered along a direction toward the first side surface portion, is formed on an inner peripheral surface side of at least the second side surface portion,
wherein the second journal bearing has a third side surface portion and a fourth side surface portion both of which extend in the radial direction, the third side surface portion is positioned nearer to the intermediate portion lubricating oil supply passage than the fourth side surface portion, and a second notch, which is tapered along a direction toward the fourth side surface portion, is formed on an inner peripheral surface side of at least the third side surface portion,
wherein the guide portion includes a first guide portion and a second guide portion being put the intermediate portion lubricating oil supply passage therebetween, and
wherein an end portion of the first guide portion on a first journal bearing side is positioned at which the end portion overlaps only with the first notch in the axial direction, and an end portion of the second guide portion on a second journal bearing side is positioned at which the end portion overlaps only with the second notch in the axial direction.

2. The oil passage according to claim 1,
wherein the guide portion is a plurality of spiral grooves which are provided on the outer peripheral surface of the rotary shaft, and the plurality of spiral grooves are provided to be turned in a reverse direction from a position at which the intermediate portion lubricating oil supply passage communicates with the space portion toward the plurality of journal bearings.

3. The oil passage according to claim 2,
wherein a nozzle facing the plurality of journal bearings is provided in an opening portion through which the intermediate portion lubricating oil supply passage communicates with the space portion.

4. The oil passage according to claim 2,
wherein a plurality of stop rings which restrict movements of the plurality of journal bearings in a direction approaching each other are provided on an inner peripheral surface of the housing, and protrusion portions extending to the plurality of journal bearings are provided on inner peripheral portions of the plurality of stop rings, as the guide portion.

5. The oil passage according to claim 1,
wherein the guide portion is a guide surface which is provided on the outer peripheral surface of the rotary shaft and is inclined from a center side of the rotary shaft toward the outer peripheral surface side.

6. The oil passage according to claim 5,
wherein the rotary shaft includes large-diameter portions which are supported by the plurality of journal bearings and small-diameter portions which are positioned between the plurality of journal bearings, and the guide surface is inclined from an outer peripheral surface of the small-diameter portion toward an outer peripheral surface of the large-diameter portion.

7. The oil passage according to claim 6,
wherein a nozzle facing the plurality of journal bearings is provided in an opening portion through which the intermediate portion lubricating oil supply passage communicates with the space portion.

8. The oil passage according to claim 6,
wherein a plurality of stop rings which restrict movements of the plurality of journal bearings in a direction approaching each other are provided on an inner peripheral surface of the housing, and protrusion portions extending to the plurality of journal bearings are provided on inner peripheral portions of the plurality of stop rings, as the guide portion.

9. The oil passage according to claim 5,
wherein a nozzle facing the plurality of journal bearings is provided in an opening portion through which the intermediate portion lubricating oil supply passage communicates with the space portion.

10. The oil passage according to claim 5,
wherein a plurality of stop rings which restrict movements of the plurality of journal bearings in a direction approaching each other are provided on an inner peripheral surface of the housing, and protrusion portions extending to the plurality of journal bearings are provided on inner peripheral portions of the plurality of stop rings, as the guide portion.

11. The oil passage according to claim 1,
wherein a nozzle facing the plurality of journal bearings is provided in an opening portion through which the intermediate portion lubricating oil supply passage communicates with the space portion.

12. The oil passage according to claim 11,
wherein a plurality of stop rings which restrict movements of the plurality of journal bearings in a direction approaching each other are provided on an inner peripheral surface of the housing, and protrusion portions extending to the plurality of journal bearings are provided on inner peripheral portions of the plurality of stop rings, as the guide portion.

13. The oil passage according to claim 1,
wherein a plurality of stop rings which restrict movements of the plurality of journal bearings in a direction approaching each other are provided on an inner peripheral surface of the housing, and protrusion portions extending to the plurality of journal bearings are provided on inner peripheral portions of the plurality of stop rings, as the guide portion.

14. The oil passage according to claim 1, further comprising:
a tubular member which is accommodated in the space portion between the plurality of journal bearings and into which the rotary shaft is inserted,
wherein the tubular member includes a plurality of through-holes which penetrate the tubular member in a radial direction to communicate with the intermediate portion lubricating oil supply passage, and the housing includes a recessed portion provided on a vertically lower inner peripheral surface facing the space portion, as the guide portion.

15. The oil passage according to claim 1, further comprising:
a tubular member which is accommodated in the space portion between the plurality of journal bearings and into which the rotary shaft is inserted,
wherein the tubular member includes a plurality of through-holes which penetrate the tubular member in a radial direction to communicate with the intermediate portion lubricating oil supply passage, and a recessed portion, which communicates with the plurality of through-holes and faces an inner peripheral surface of the housing, as the guide portion.

16. The oil passage according to claim 1, further comprising:
a tubular member which is accommodated in the space portion between the plurality of journal bearings and into which the rotary shaft is inserted,
wherein the tubular member includes a plurality of through-holes which penetrate the tubular member in a radial direction to communicate with the intermediate portion lubricating oil supply passage, and protrusion portions which extend to the plurality of journal bearings, as the guide portion.

17. An exhaust turbine turbocharger, comprising:
a turbine;
a compressor;
a rotary shaft which coaxially connects the turbine and the compressor to each other;
a bearing structure which includes a plurality of journal bearings rotatably supporting the rotary shaft; and
an oil passage that supplies a lubricating oil to the plurality of journal bearings provided in a housing having a hollow shape, the plurality of journal bearings rotatably supporting the rotary shaft disposed inside the housing at at least two locations in an axial direction of the rotary shaft, the oil passage including:
a plurality of outer peripheral portion lubricating oil supply passages through which a lubricating oil is supplied to outer peripheral surfaces of the plurality of journal bearings;
an intermediate portion lubricating oil supply passage through which the lubricating oil is supplied to a space portion between the plurality of journal bearings; and
a guide portion which guides the lubricating oil, which is supplied from the intermediate portion lubricating oil supply passage to the space portion, to inner peripheral surfaces of the plurality of journal bearings,
wherein the lubricating oil is supplied to the outer peripheral surfaces and the inner peripheral surfaces of the plurality of journal bearings without flowing inside the plurality of journal bearings,
wherein each of the plurality of journal bearings is accommodated in an accommodating portion defined by an inner peripheral surface of the housing, and is rotatable inside the accommodating portion about a rotating shaft of the rotary shaft,
wherein an inner peripheral surface of each of the plurality of journal bearings rotatably supports the rotary shaft,
wherein said each of the plurality of journal bearings defines no oil flow passage extending inside said each of the plurality of journal bearings between an outer peripheral surface and the inner peripheral surface of said each of the plurality of journal bearings,
wherein the guide portion is provided on an outer peripheral surface of the rotary shaft,
the plurality of journal bearings includes a first journal bearing and a second journal bearing,
wherein the first journal bearing has a first side surface portion and a second side surface portion both of which extend in a radial direction of the rotary shaft, the second side surface portion is positioned nearer to the intermediate portion lubricating oil supply passage than the first side surface portion, and a first notch, which is tapered along a direction toward the first side surface portion, is formed on an inner peripheral surface side of at least the second side surface portion,
wherein the second journal bearing has a third side surface portion and a fourth side surface portion both of which extend in the radial direction, the third side surface portion is positioned nearer to the intermediate portion lubricating oil supply passage than the fourth side surface portion, and a second notch, which is tapered along a direction toward the fourth side surface portion, is formed on an inner peripheral surface side of at least the third side surface portion,
wherein the guide portion includes a first guide portion and a second guide portion being put the intermediate portion lubricating oil supply passage therebetween, and
wherein an end portion of the first guide portion on a first journal bearing side is positioned at which the end portion overlaps only with the first notch in the axial direction, and an end portion of the second guide portion on a second journal bearing side is positioned at which the end portion overlaps only with the second notch in the axial direction.

\* \* \* \* \*